US005865593A

United States Patent [19]

Cohn

[11] Patent Number: 5,865,593

[45] Date of Patent: Feb. 2, 1999

[54] WHEELCHAIR LIFT WITH WHEELCHAIR BARRIER PLATFORM INTERLOCK MECHANISM

[75] Inventor: Alan Cohn, Lockeford, Calif.

[73] Assignee: Lift-U, Division of Hogan Mfg., Inc., Escalon, Calif.

[21] Appl. No.: 775,640

[22] Filed: Dec. 31, 1996

[51] Int. Cl.[6] .................... B60D 1/46

[52] U.S. Cl. .................... 414/546; 414/917; 414/921; 414/545

[58] Field of Search .................... 414/539, 540, 414/541, 545, 546, 917; 187/200, 901; 254/2 R

[56] References Cited

U.S. PATENT DOCUMENTS

| | | | |
|---|---|---|---|
| Re. 31,178 | 3/1983 | Deacon . | |
| Re. 33,595 | 5/1991 | Sullivan et al. . | |
| 3,737,009 | 6/1973 | Stoddard . | |
| 3,888,463 | 6/1975 | O'Brien et al. . | |
| 4,083,429 | 4/1978 | Abbott . | |
| 4,124,130 | 11/1978 | Rohrs et al. . | |
| 4,180,366 | 12/1979 | Roth et al. . | |
| 4,214,849 | 7/1980 | Downing . | |
| 4,251,179 | 2/1981 | Thorley . | |
| 4,270,630 | 6/1981 | Karkas | 414/545 X |
| 4,273,217 | 6/1981 | Kajita . | |
| 4,442,921 | 4/1984 | Sherman . | |
| 4,457,402 | 7/1984 | Del Vecchio et al. . | |
| 4,466,771 | 8/1984 | Thorley et al. | 414/921 X |
| 4,479,753 | 10/1984 | Thorley . | |
| 4,480,719 | 11/1984 | Risner . | |
| 4,556,128 | 12/1985 | Thorley et al. . | |
| 4,606,433 | 8/1986 | Smalley et al. . | |
| 4,664,584 | 5/1987 | Braun et al. . | |
| 4,718,812 | 1/1988 | Smalley et al. . | |
| 5,026,244 | 6/1991 | Dorn . | |
| 5,149,246 | 9/1992 | Dorn . | |
| 5,180,275 | 1/1993 | Czech et al. | 414/921 X |
| 5,228,538 | 7/1993 | Tremblay . | |
| 5,261,779 | 11/1993 | Goodrich . | |
| 5,299,904 | 4/1994 | Simon et al. . | |
| 5,316,432 | 5/1994 | Smalley et al. . | |
| 5,373,915 | 12/1994 | Tremblay . | |
| 5,375,962 | 12/1994 | Kempf | 414/921 X |
| 5,382,130 | 1/1995 | Kempf . | |
| 5,401,135 | 3/1995 | Stoen et al. . | |
| 5,433,580 | 7/1995 | Kempf . | |
| 5,439,342 | 8/1995 | Hall et al. . | |
| 5,445,488 | 8/1995 | Saucier et al. . | |

FOREIGN PATENT DOCUMENTS

| | | |
|---|---|---|
| 1 137 929 | 12/1982 | Canada . |
| 27 59 017 | 12/1977 | Germany . |
| 2 055 344 | 3/1981 | United Kingdom . |
| WO 80/02538 | 11/1980 | WIPO . |
| WO 90/05072 | 5/1990 | WIPO . |
| WO 92/20313 | 11/1992 | WIPO . |
| WO 94/27546 | 12/1994 | WIPO . |

*Primary Examiner*—Frank E. Werner
*Attorney, Agent, or Firm*—Christensen O'Connor Johnson & Kindness PLLC

[57] ABSTRACT

A platform-type wheelchair lift for mounting in the stairwell of a vehicle, such as a bus or train. The wheelchair lift includes a platform frame that is movable from a retracted position in which it is stowed underneath the vehicle to an extended position in which it extends out from the side or back of the vehicle. A wheelchair platform is movably coupled to the platform frame by a parallelogram linkage that allows the wheelchair platform to move between a lowered and a raised position. The wheelchair platform includes foldable outer and inner wheelchair barriers that prevent a wheelchair from moving off of the wheelchair platform during operation of the wheelchair lift. The wheelchair platform also includes a mechanical platform interlock mechanism. The platform interlock mechanism is moveable between an unlocked and a locked position. The platform interlock mechanism is in an unlocked position when no weight is placed on the wheelchair platform. In the unlocked position, the platform interlock mechanism allows the outer barrier to move between an upright barrier position, and a retracted position in which the barrier lies adjacent an upper surface of the wheelchair platform. When a weight such as a person or wheelchair is located on the wheelchair platform, the platform interlock mechanism moves into a locked position in which the outer barrier is prevented from moving between the upright position and the retracted position.

25 Claims, 15 Drawing Sheets

WHEELCHAIR LIFT WITH WHEELCHAIR BARRIER PLATFORM INTERLOCK MECHANISM

FIELD OF THE INVENTION

The present invention relates to wheelchair lifts, and more particularly, to platform type wheelchair lifts that include platforms that extend out from the side or back of a vehicle and move between a lowered position and a raised position.

BACKGROUND OF THE INVENTION

Wheelchair lifts of the type installed in the stairwells of transit vehicles, such as city buses, are well-known. One type of wheelchair lift commonly referred to as a "step lift," is illustrated in U.S. Pat. No. 4,466,771 to Thorley et al. (the '771 patent). Another type of wheelchair lift, commonly referred to as a "platform lift," is illustrated in U.S. Pat. No. 4,058,228 to Hall (the '228 patent).

Both wheelchair step lifts and platform lifts typically include a wheelchair platform that is movable from a lowered position in which the wheelchair platform lies adjacent the sidewalk or ground to a raised position in which the wheelchair platform lies in the same plane as the aisle way of the bus, train, or other vehicle on which the lift is mounted. A wheelchair is loaded onto the wheelchair platform when it is in the lowered or raised position at which time the platform is moved to the opposite position in order to allow the wheelchair to be moved into or out of the bus or other vehicle on which the wheelchair lift is mounted. In order to decrease storage space and improve usability, a number of platform-type wheelchair lifts such as that described in the '228 patent include wheelchair platforms that retract under the bottom of the bus or other vehicle on which the lift is mounted. In some wheelchair lifts such as that disclosed in the '228 patent, the wheelchair platform forms the lower step of the vehicle entryway.

A number of wheelchair lifts incorporate outer and sometimes inner (with respect to the vehicle) foldable barriers that help to maintain a wheelchair on the wheelchair platform. In addition, some wheelchair lifts include fixed side barriers to help maintain the wheelchair on the wheelchair platform. It would be beneficial if improved outer and inner barriers could be developed to ensure that a wheelchair cannot move off the wheelchair platform during operation of the wheelchair lift. It would also be beneficial to provide some type of electrical and/or mechanical mechanism to ensure that the wheelchair barriers and the wheelchair lift operate in ways which do not allow the barriers to operate improperly.

As can be seen from the discussion above, there exists a need in the industry for wheelchair lifts having improved wheelchair barriers. The present invention is directed toward fulfilling this need.

SUMMARY OF THE INVENTION

The present invention is a wheelchair lift that includes foldable outer and/or inner wheelchair barriers that help to prevent a wheelchair from moving off of the ends of the wheelchair platform. In one embodiment, the wheelchair lift includes a wheelchair platform that is moveable between a raised position and a lowered position. The wheelchair platform includes at least one wheelchair barrier pivotally attached to one end of the wheelchair platform. The wheelchair barrier is moveable between an extended position in which the wheelchair barrier extends outward from the end of the wheelchair platform, an upright position in which the wheelchair platform extends upward from the surface of the wheelchair platform, and thus prevents an article located on the wheelchair platform from moving off the end of the wheelchair platform and a retracted position in which the wheelchair barrier lies approximately adjacent to the upper surface of the wheelchair platform. The wheelchair lift also includes a platform interlock mechanism. The platform interlock mechanism is moveable between an unlocked position in which the wheelchair barrier is free to move between the upright position and the retracted position and a locked position in which the platform interlock mechanism mechanically prevents the wheelchair barrier from moving from the upright position to the retracted position.

In accordance with other features of the invention, the platform interlock mechanism remains in the locked position whenever a weight is placed on the wheelchair platform. The platform interlock mechanism moves from the locked position to the unlocked position when the weight is removed from the wheelchair platform.

In accordance with still other aspects of the invention, the wheelchair platform includes a hinge mechanism that moves the wheelchair barrier between the upright and retracted positions. The platform interlock mechanism includes an interlock pin that mechanically prevents the movement of the hinge mechanism toward the retracted position when the interlock mechanism is in the locked position.

In accordance with further aspects of the invention, the platform interlock mechanism includes a biasing mechanism that biases it into the unlocked position. The platform interlock mechanism also includes an electrical sensor that detects the position of the platform interlock mechanism. The electrical sensor provides a control signal indicative of the position of the platform interlock mechanism to the wheelchair lift's control system.

In accordance with still further aspects of the invention, the wheelchair lift includes a deformable deck. The deck deforms when the weight is placed on the deck, thus causing the platform interlock mechanism to move between the locked and unlocked positions. The platform interlock mechanism also includes at least one interlock link that extends from approximately the center of the platform to approximately the edge of the platform on which the wheelchair barrier is mounted. The interlock link moves inward and outward in response to deformation of the deck in order to lock or unlock the platform interlock mechanism.

In accordance with yet other aspects of the invention, the wheelchair lift also includes a ground interlock mechanism. The ground interlock mechanism mechanically prevents movement of the wheelchair barrier from the upright position to the extended position when the wheelchair platform is not contacting the ground. The ground interlock mechanism prevents the wheelchair barrier from moving from the upright position to the extended position by mechanically preventing movement of the hinge mechanism when the ground interlock mechanism is in the locked position.

The wheelchair lift of the invention helps to reduce or eliminate a number of the problems associated with prior art wheelchair lifts. The invention's use of an inner barrier to form a bridge between the wheelchair platform and the steps of a vehicle on which the lift is mounted allows the invention to be used on different vehicles with only minor changes. The same wheelchair lift may be used on different vehicles by adjusting the height to which the wheelchair platform raises and the length of the inner barrier.

The foldable outer and inner barriers also prevent a wheelchair from moving off the wheelchair platform. The wheelchair lift's incorporation of a platform interlock mechanism also ensures that the inner and outer barriers do not fold inward onto an article or person on the wheelchair platform. The platform interlock mechanism both mechanically and electrically prevents the barriers from folding inward, thus providing system redundancy. In addition, the ground interlock mechanism prevents the outer barrier from folding into its extended position in which a wheelchair lift may roll off of the wheelchair platform until the wheelchair platform is in contact with the ground.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENTS

Figure 1:
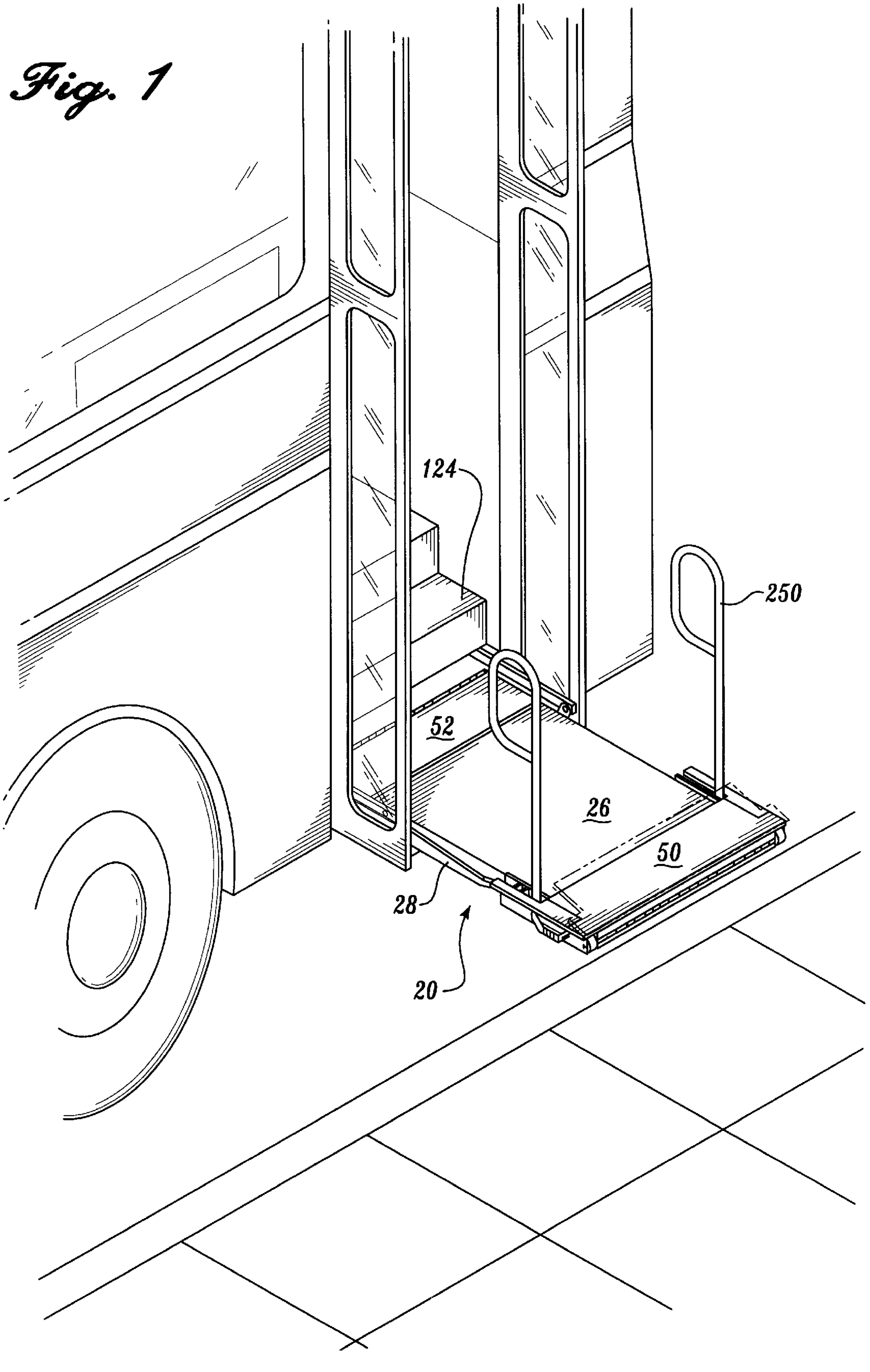
FIG. 1 is a perspective view of a wheelchair lift according to the present invention mounted within the entryway of a bus.
Figure 2:
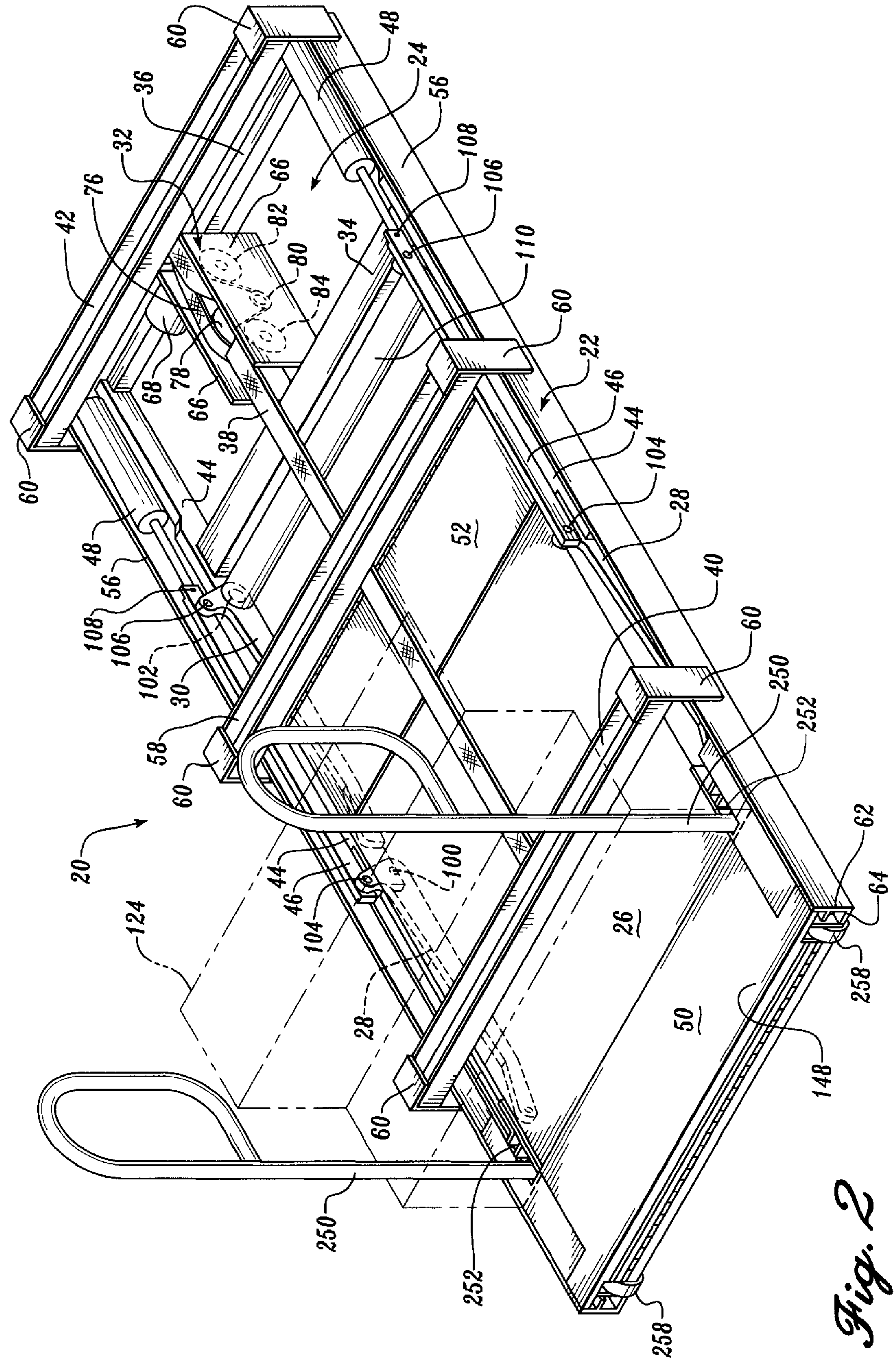
FIG. 2 is a perspective view of a wheelchair lift of the present invention showing the wheelchair platform retracted within the frame of the wheelchair lift.
Figure 3:
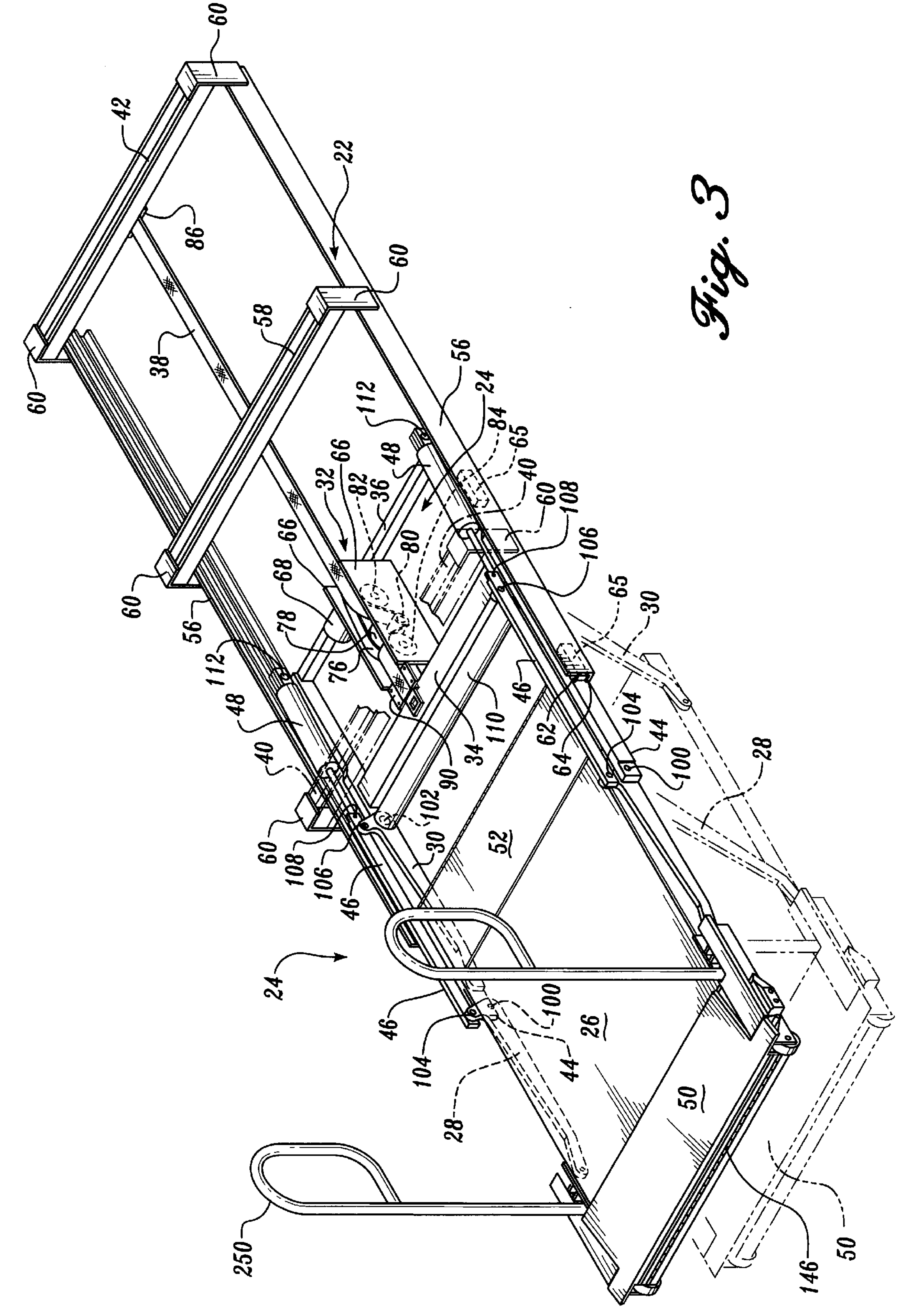
FIG. 3 is a perspective view of the wheelchair lift of FIG. 2 showing the wheelchair platform in an extended and a lowered position.
Figure 4:
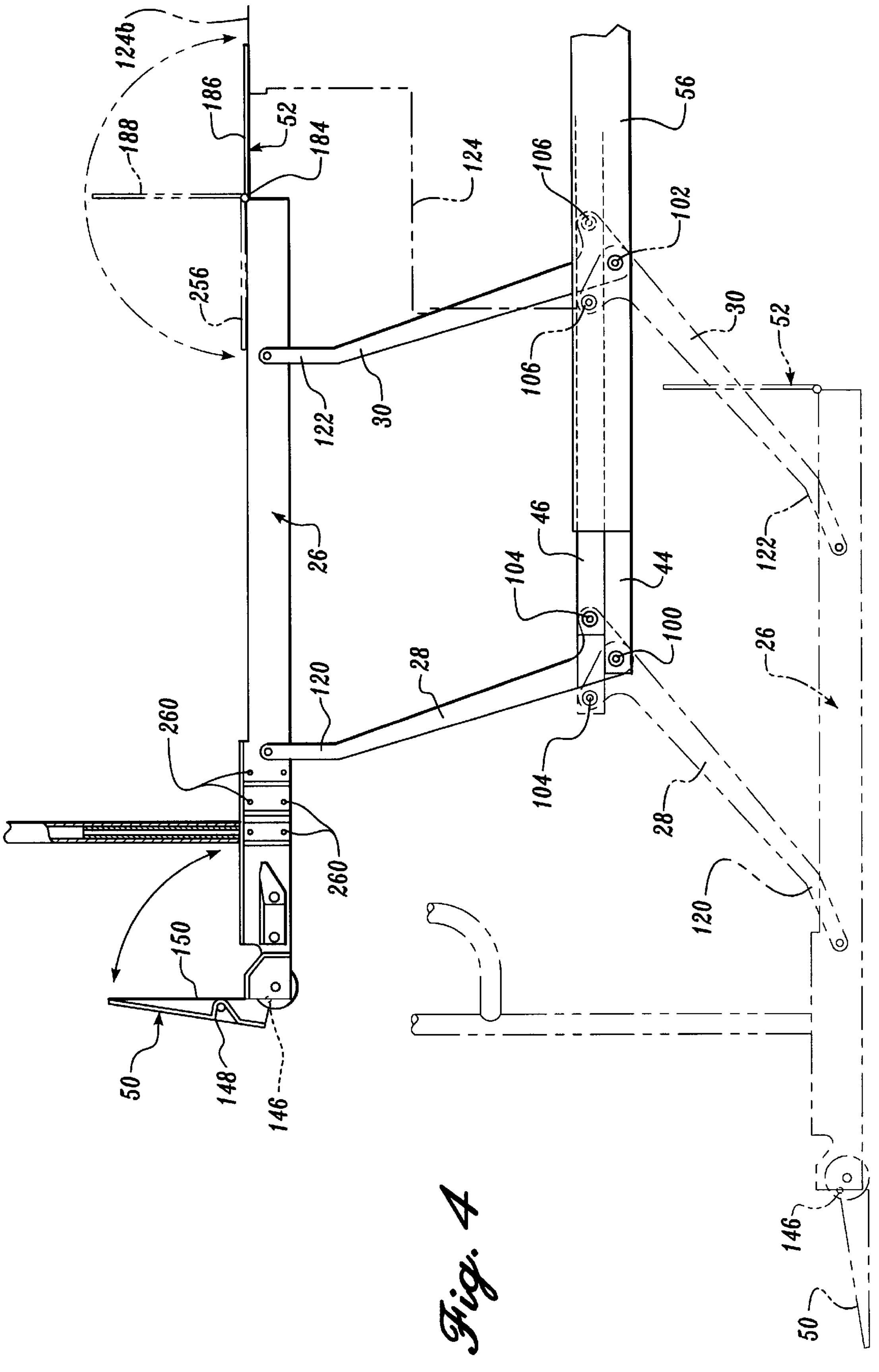
FIG. 4 is a side elevational view of the wheelchair lift of FIG. 2 illustrating the wheelchair platform in a lowered and a raised position.

A platform-type wheelchair lift generally designated 20 constructed according to the present invention is illustrated in FIGS. 1–3. The wheelchair lift 20 includes a generally rectangular stationary frame 22 that is mounted to the underside of a vehicle such as a bus or train. A wheelchair platform frame generally designated 24 (FIG. 3) is slidably mounted within the stationary frame 22 so that the platform frame may move between a first or retracted position (FIG. 2) in which the platform frame is retracted underneath the floor of the vehicle to a second or extended position (FIG. 3) in which the platform frame 24 extends outward from the vehicle on which the wheelchair lift is mounted. A wheelchair platform 26 is mounted within the platform frame 24 through the use of outer platform arms 28 and inner platform arms 30 so that the wheelchair platform may be moved from a lowered position as best seen in phantom in FIGS. 3 and 4 to a raised position as shown in FIG. 4.

When the platform frame 24 is fully extended and the wheelchair platform 26 is in the lowered position (shown in phantom in FIGS. 3 and 4), a wheelchair occupant may maneuver a wheelchair onto or off of the wheelchair platform 26. The wheelchair platform 26 is then moved to its raised position (FIG. 4), at which time the wheelchair occupant may maneuver the wheelchair into or out of the interior of the bus or other vehicle, as described in more detail below.

The platform frame 24 is moved between the extended and retracted positions by a belt drive mechanism designated 32. The belt drive mechanism 32 is attached to the platform frame 24 between outer and inner cross members 34 and 36 that extend across the width of the platform frame. The belt drive mechanism 32 extends and retracts the platform frame 24 by moving the platform frame along a primary belt 38 that extends between an outer cross member 40 and an inner cross member 42 of the stationary frame 22 as best illustrated in FIGS. 2 and 3 and as described in more detail below.

The wheelchair platform 26 is raised and lowered through the use of the outer and inner arms 28 and 30. The arms 28 and 30 are attached at one end to the wheelchair platform 26 and at the other end to two platform frame arms 44 that form the opposing sides of the platform frame 24. The outer and inner arms 28 and 30 are rotated around pivots on the platform frame arms 44 through the use of opposing pairs of parallel drive links 46. Each drive link 46 (FIG. 4) is rotatably attached to an elongated end of the inner arms 28 and 30 (as best seen in FIG. 4) as described in more detail below. As the drive links 46 are moved outward or inward with respect to the platform frame arms 44, they cause the outer and inner arms 28 and 30 to rotate with respect to the platform frame arms. Each drive link 46 and thus outer and inner arm 28 and 30 is driven by hydraulic actuator 48. Each hydraulic actuator 48 is attached at the actuator end to the inner end of the platform frame arms 44 and at the rod end to the inner end of the drive links 46 as best illustrated in FIG. 2 and as described in more detail below.

The wheelchair platform 26 includes a foldable outer wheelchair barrier 50, and a foldable wheelchair platform extension and inner wheelchair barrier 52, as shown in FIG. 4. The outer and inner barriers 50 and 52 help to ensure that a wheelchair and wheelchair occupant remain on the wheelchair platform 26 during operation of the wheelchair lift 20. The detailed structure and operation of the wheelchair platform and the foldable barriers will be described in more detail below.

The rectangular stationary frame 22 includes two opposing side members 56 (FIG. 2) that are separated by and joined together by the outer cross member 40, a middle cross member 58, and the inner cross member 42. The three cross members 40, 58, and 42 are located above the frame side members 56 and are joined to the frame side members at each end by pieces 60 that are welded or otherwise fastened to the frame side members 56 and the cross members 40, 58, and 42. The pieces 60 and cross members 40, 58, and 42 also serve as mounting brackets to attach the stationary frame 22 to the underside of a vehicle or other structure by bolting, welding, or other suitable fastening method.

Each frame side member 56 includes upper and lower inwardly extending elongated rails 62 and 64 as indicated in FIGS. 2 and 3. The platform frame 24 is slidably mounted within the stationary frame 22 through the use of a series of slide bearings 65 mounted along the length of the platform frame arms 44. Each slide bearing 65 extends outward from the outer surface of the respective platform frame arm 44 into a slot formed by the upper and lower rails 62 and 64. It is advantageous to form the upper and lower rails 62 and 64 of wear resistant stainless steel or other material which does not corrode or pit and the slide bearings 65 out of a low friction material such as nylon, Teflon, or another suitable low friction bearing material.

The platform frame 24 is formed of the opposing side platform frame arms 44 that are joined together by the outer cross member 34 (FIG. 3) and the inner cross member 36. The inner cross member 36 is located approximately adjacent to the inner end of the platform frame arms 44 while the outer cross member 34 extends between a midpoint of the platform frame arms. The cross members 34 and 36 are attached to the platform arms 44 by welding, bolting, or other suitable fastening method. As described briefly above, the platform frame 24 is moved between its extended and retracted positions as shown in FIGS. 2 and 3 by the belt drive mechanism 32.

The belt drive mechanism 32 includes two opposing parallel support plates 66 that are spaced apart and joined at opposite ends to the outer cross member 34 and inner cross member 36 by welding, bolting, or other suitable fastening method. A drive motor 68 is mounted on one of the plates 66 such that the shaft of the drive motor extends through one of the plates 66.

A drive reduction belt 76 extends around a drive pulley (not shown) on the shaft of the drive motor 68 and around a larger secondary pulley 78. The larger secondary pulley 78 is rotatably mounted on a drive axle that is connected to a smaller secondary drive pulley 80. The secondary pulley 78 serves as a reduction pulley to decrease the speed and increase the torque from the drive motor 68.

A primary belt 38 (FIGS. 2 and 3) extends over the secondary drive pulley 80 and an inner idler pulley 82 and an outer idler pulley 84 that are mounted on either side of the smaller secondary drive pulley 80. The inner end of the primary belt 38 is attached to the lower surface of the inner cross member 42 by a quick release clamp 86 (FIG. 3) that is bolted or otherwise releasably attached to the rear cross member 42 of the stationary frame 22. The outer end of the primary belt 38 is similarly attached to the outer cross member 40 of the stationary frame 22 by a quick release clamp 90.

As the shaft of the drive motor 68 rotates counterclockwise, the large secondary pulley 78 and small secondary drive pulley 80 rotate counterclockwise. The counterclockwise movement of the small secondary drive pulley 80 causes the belt drive 32 and thus platform frame 24 to move outward along the length of the primary belt 38, thus extending the platform frame. Similarly, as the shaft of the drive motor 68 is rotated clockwise the platform frame 24 moves inward along the length of the primary belt 38, thus retracting the platform frame. The movement of the drive motor 68 and thus platform frame 24 is controlled by a control system (not shown) that is connected to the drive motor 68.

As discussed briefly above, the wheelchair platform 26 is attached to the platform frame arms 44 by outer arms 28 and inner arms 30 that form a parallelogram linkage between the platform frame arms and the wheelchair platform. The parallelogram linkage keeps the platform frame arms 44 and wheelchair platform 26 parallel throughout the movement of the wheelchair platform from a lowered position to a raised position and vice versa. The ends of the arms 28 and 30 attached to the platform frame arms 44 are elongated (FIGS. 3 and 4) and include laterally spaced apart pivots that are attached to the platform frame arms 44 and the drive links 46. As best seen in FIG. 4, the lower portion of the elongated portion of the arms 28 and 30 is pivotally attached to the platform frame arms 44 at pivots 100 and 102, respectively. The upper portion of the elongate portion of each arm 28 and 30 is attached to a drive link 46 at pivots 104 and 106, respectively. As the drive links 46 are moved outward or inward with respect to the platform arms 44 as best seen in FIG. 4, the outer and inner arms 28 and 30 pivot about pivots 100 and 102, respectively, thus lowering or raising the platform 26.

The inner end of each drive link 46 is attached to the rod of one of the hydraulic actuators 48 at a pivot 108 as best seen in FIGS. 2 and 3. The inner arms 30 are also joined together at the pivot points 102 by a torque tube 110 that is welded or otherwise fastened to the inner surfaces of the inner arms 30. The torque tube 110 ensures that the inner arms 30 move in unison and thus maintain the same orientation with respect to each other. The torque tube 110 allows the two hydraulic actuators 48 to work together and also ensures that if there is a malfunction in the wheelchair lift the platform 26 is maintained at the same elevation on both sides and does not cant or lean, possibly causing harm to the wheelchair occupant.

The drive links 46 are moved outward or inward with respect to the platform frame arms 44 by the extension or retraction of the rods of the hydraulic actuators 48. The hydraulic actuators 48 are attached to the drive links 46 at pivots 108 at one end and are pivotally attached to the platform frame arms 44 at pivot points 112 at the other end as best seen in FIG. 3.

In order to assist the platform 26 in clearing the stairs 124 (FIGS. 1, 2 and 4) of the bus or similar vehicle on which the wheelchair lift 20 is mounted, the ends 120 and 122 of the arms 28 and 30, respectively, are bent upward or inward as shown in FIG. 4. Configuring the wheelchair lift as shown with arms 28 and 30 having elongated portions attached at the upper end to a drive link 46 and at the lower end to a platform frame arm 44 and inwardly bent ends 120 and 122 helps the wheelchair platform 26 to clear the stairs 124 (FIG. 4) without requiring an excessive extension of the platform frame 24 out from underneath the stairs 124.

As best seen in FIG. 4, the outer and inner wheelchair barriers 50 and 52 are rotatably attached to the front edge of the wheelchair platform 26 and the rear edge of the wheelchair platform respectively. The rear edge of the outer barrier 50 is rotatably attached to the front edge of the wheelchair platform 26 over its length by hinge 146 (FIG. 3). The outer barrier rotates about the hinge 146 such that it is movable from a fully folded position as illustrated in FIG. 2, to a fully extended position as illustrated in phantom in FIG. 4. The inner barrier 52 (FIG. 4) is rotatably mounted to the inner edge of the platform 26 using a hinge 184. The inner barrier 52 is movable between a fully retracted position in which the upper surface of the inner barrier 52 lies adjacent to the upper surface of the wheelchair platform 26, as illustrated in phantom in position 256, to an upright position illustrated in phantom in position 188, to a fully extended position 186 in which the upper surface of the inner barrier 52 forms an extension of the upper surface of the wheelchair platform 26 as shown in FIG. 4.

Figure 5:
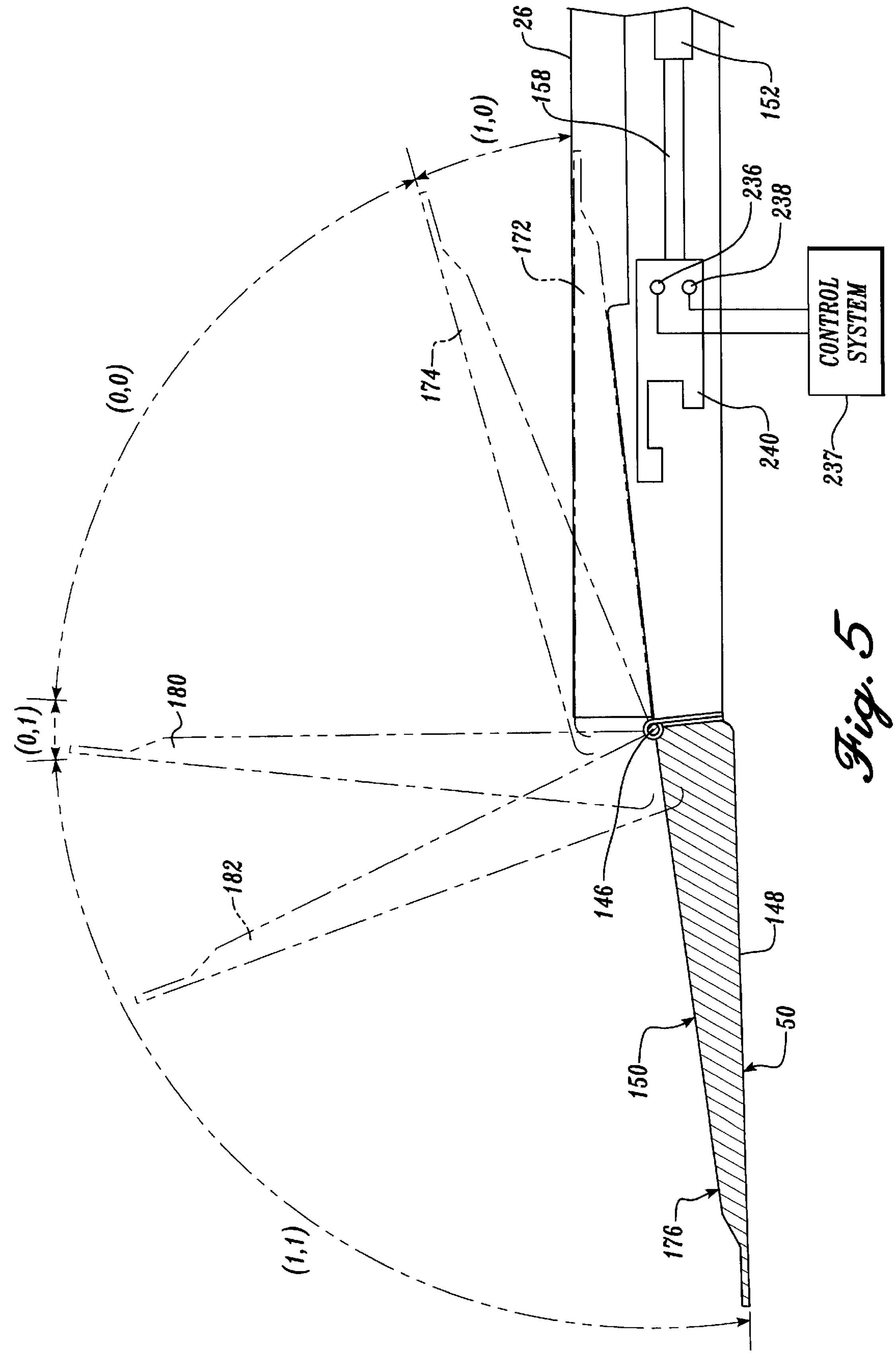
FIG. 5 is a schematic representation of the outer wheelchair barrier of the wheelchair lift of FIG. 2 showing the various operational positions of the barrier.

The structure and operation of the outer and inner wheelchair barriers 50 and 52, respectively, will now be described by reference to FIGS. 5 and 12. The rear edge of the outer barrier 50 is rotatably attached to the front edge of the wheelchair platform 26 over its width by the hinge 146 as seen in FIG. 5A. As illustrated in FIG. 5, the outer barrier 50 rotates around the hinge 146 such that the barrier is movable from a fully retracted position 172 in which it is in an overlapping relationship with the wheelchair platform 26, to a fully extended position 176 in which barrier 50 extends in approximately the same plane as the wheelchair platform.

As shown in FIG. 5, in the fully retracted position 172, the lower surface 148 of the outer barrier 50 faces upward and forms the bottom stair step 124 of the vehicle in which the wheelchair lift 20 is mounted (see phantom steps in FIG. 2), while the upper surface 150 of the outer barrier lies adjacent the upper surface of the platform 26. In its fully extended position 176, the outer barrier 50 extends outward from the end of the wheelchair platform 26. The upper surface 150 of the outer barrier 50 slants upward to form a triangular shape such that in its extended position 176 the outer barrier forms a ramp that helps a wheelchair occupant to move a wheelchair up the ramp and onto the wheelchair platform 26.

Figure 12:
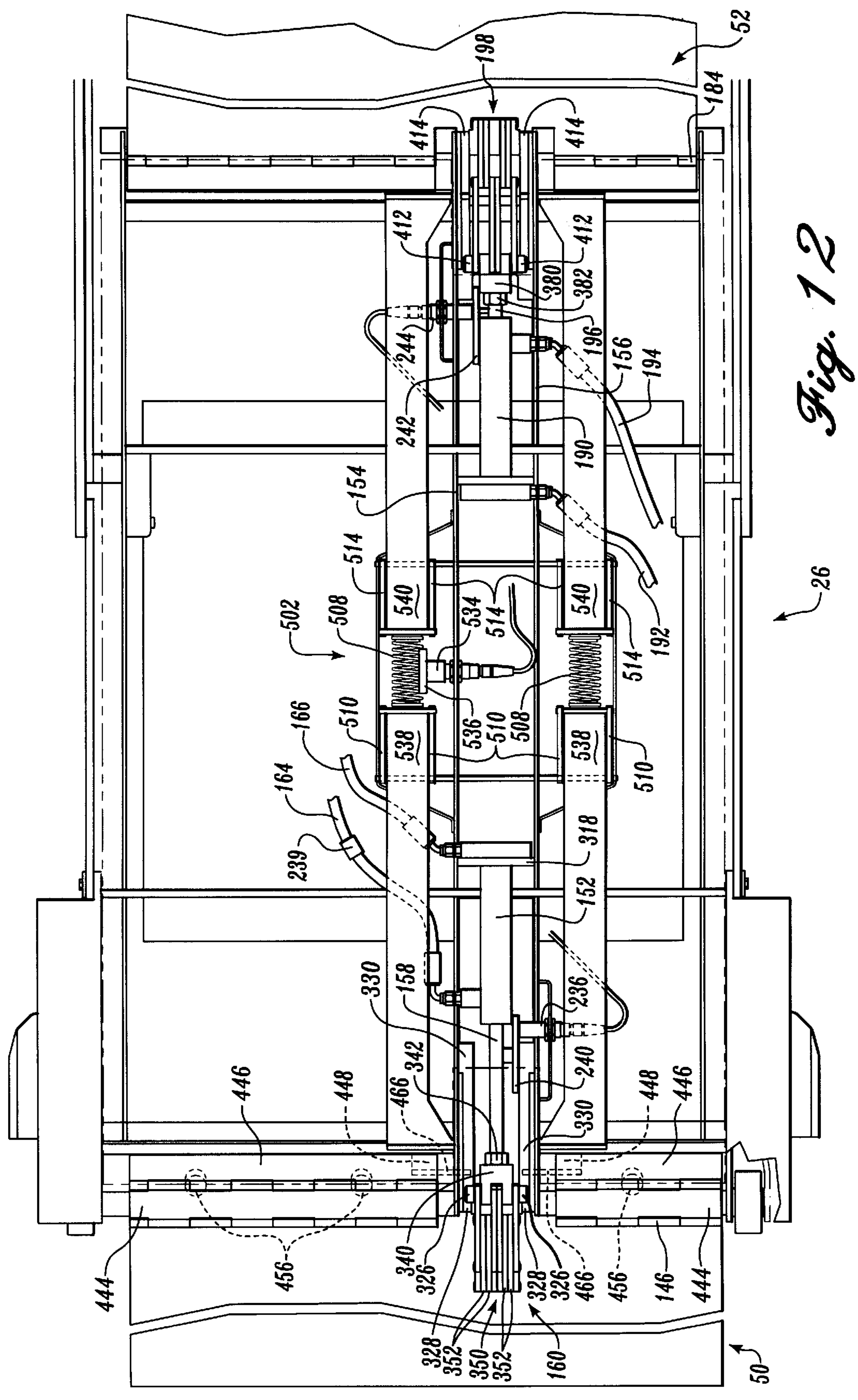
FIG. 12 is a top partial cutaway view of the wheelchair lift platform of FIG. 6A.

As shown in FIG. 12, the barrier 50 is moved between its extended and retracted positions by a hydraulic cylinder 152 that is mounted on opposing spaced-apart support frames 154 and 156 that run the length of the wheelchair platform 26. The hydraulic cylinder 152 includes a rod 158 that is mounted to a hinge mechanism 160 at its free end. The hydraulic cylinder 152 is connected to a hydraulic control system (not shown) through hydraulic lines 164 and 166.

The preferred embodiment of the hinge mechanism 160 is described in more detail below. In alternate embodiments, the hinge mechanism 160 could be any suitable hinge mechanism capable of moving the outer barrier 50 through approximately 180° of movement so that the outer barrier may be moved between its extended and retracted positions. One suitable hinge mechanism is described in U.S. Pat. No. 5,284,418 to Kempf, the disclosure of which is hereby specifically incorporated by reference.

In addition to serving as a ramp, the outer barrier 50 also serves as a wheelchair barrier to prevent a wheelchair located on the wheelchair platform 26 from moving off the outer edge of the wheelchair platform. The various positions of the outer barrier 50 are best illustrated in FIG. 5. From the fully retracted position 172, the barrier 50 can move upward, pivoting on hinge 146 to an unlatched position 174. When the barrier 50 is in the unlatched position 174, the platform frame 24 can be moved between its extended and retracted positions, as described above. Once the platform frame 24 is in its extended position, the outer barrier 50 moves from the unlatched position 174 to the approximately upright position 180. When the platform 26 is lowered to the ground, the barrier 50 moves from the upright position 180 to the fully extended position 176 in which the outer barrier serves as a ramp between the ground and the platform. Once a wheelchair is located on the platform 26, the outer barrier 50 moves back to the upright position 180 in which it acts to prevent a wheelchair from moving off of the front of the wheelchair platform 26.

The outer barrier in its upright position 180 can also act as an energy-absorption, energy-dissipation safety barrier to absorb or dissipate some of the energy of an impact with a wheelchair located on the wheelchair platform 26. In order to absorb and dissipate the energy of collision, the control system 237 (FIG. 5) that controls the hydraulic cylinder 152 can include a pressure relief valve 239 that is set at a predetermined pressure. When a wheelchair rolls into the outer barrier 50, the outer barrier moves from the fully upright position 180 to a partially lowered position 182 as the hydraulic fluid pressure in the hydraulic cylinder 152 is relieved by the pressure relief valve 239. The movement of the outer barrier 50 between the upright position 180 and partially lowered position 182 allows the outer barrier to absorb and dissipate part of the energy of collision between a wheelchair and the outer barrier, thus helping to reduce any injury to the wheelchair occupant or damage to the wheelchair or lift.

The control system 237 detects the various positions of the outer barrier 50 through the use of two proximity sensors 236 and 238 (FIGS. 5 and 12) and a proximity plate 240 (FIGS. 5 and 12). The proximity sensors 236 and 238 are mounted on the support frame 156 while the proximity plate 240 is mounted on the rod 158 such that it moves outward and inward along with the rod. The proximity sensors 236 and 238 are used to provide a digital indication of the various positions of the outer barrier 50. Each sensor 236 and 238 provides a “0” or “1” signal depending on whether part of the proximity plate 240 which is formed from a target material is located in front of the sensor. A “1” signal is given from a sensor which has the target material in front of it. The information from the sensors is thus digital in nature.

As shown in FIG. 5, when the outer barrier 50 is in its fully extended position 176, the proximity plate 240, which moves with the rod 158, is in front of both of the proximity sensors 236 and 238 and thus provides the control system with a (1,1) position signal indication. The (1,1) signal is comprised of the signal from the sensor 236 as the first digit, and the signal from the sensor 238 as the second digit. The signals corresponding to each range of positions are shown schematically above the various positions of the outer barrier 50 in FIG. 5. When the outer barrier 50 reaches the fully upright position 180, the proximity plate 240 has moved inward to a point where a cut-out section of the plate 240 is in front of sensor 236 and a lower extended part of the plate 240 is in front of the sensor 238, thus providing the control system 237 with a position indication of (0,1). As the outer barrier 50 moves slightly past the upright position 180 towards the retracted position 174, the cut-out section of the proximity plate 240 is in front of both of the sensors 236 and

238, which thus provides the control system with a position indication of (0,0). When the rod 158 has moved inward to the point that the outer barrier 50 is in the unlatched position 174, an upper extended portion of the proximity plate 240 is in front of the sensor 236, and the cut-out section is in front of the sensor 238, thus providing a position indication of (1,0). The position indication of (1,0) is provided to the control system throughout the outer barrier's movement from the unlatched position 174 to the stowed and latched position 172.

Failure of the sensors 236 and 238 can cause the control system to receive erroneous signals as to the outer barrier's position. For example, if the sensor 236 were to fail low, it would output a constant "0" signal regardless of the position of the plate 240. The outer barrier 50 is designed to make the lift safer with regard to the motion of the outer barrier 50 should sensor failure occur. Safety during the period when the barrier 50 is moving from the extended position 176 to the upright position 180 is important because a passenger may be on the lift. The dangers during outer barrier movement are that due to sensor failure the barrier 50 will fail to move far enough upwards towards the upright position 180 to properly protect the passenger, or that the barrier 50 will move past the upright position 180 and trap or crush a person or object between the barrier 50 and the wheelchair platform 26. Such dangers are avoided using the sensors 236 and 238.

The following example helps illustrate how the sensors 236 and 238 are used to increase barrier safety. Once a passenger has boarded the platform 26, the lift is designed to move the outer barrier 50 from the extended position 176 (FIG. 5B) to a position just past the upright position 180 and then immediately back to the upright position again. Thus, using the above binary designations, the control system begins rotating the barrier clockwise from the ramp (1,1) position and continues rotating it until it receives a (0,0) sensor signal, which will occur immediately after the normal upright (0,1) position. The control system then rotates the barrier 50 counterclockwise back toward the extended position 176 until it receives a (0,1) sensor signal which occurs almost immediately.

When a sensor failure occurs, it outputs a constant '0' reading regardless of whether or not the sensor plate 240 is in front of the sensor. There are three possible sensor failures which can occur and hinder the normal operation of the barrier 50. First, the sensor 236 can fail by itself, second, the sensor 238 can fail by itself, and third, both sensors can fail at the same time.

If only one of the two sensors 236 or 238 fails while the barrier 50 is moving clockwise from the extended position 176 to the upright position 180, the control system will receive either a (0,1) signal or a (1,0) signal, (depending on which sensor failed). The control system waits for a (0,0) signal before it stops moving the barrier 50 during this sequence, so it continues to move the barrier 50 even when this type of sensor failure occurs. Thus the danger of the control system prematurely stopping the barrier 50 from reaching the upright position 180, and incorrectly interpreting that it had in fact reached the upright position is avoided.

If under these circumstances the sensor 238 failed, then when the control system moves the barrier 50 to the upright position 180, the usual (0,1) signal will instead register as a (0,0). As a result, the control system will incorrectly interpret that it has reached a position just past the upright position 180 and will stop the barrier 50. Once the (0,0) signal is received, the control system moves the barrier 50 counterclockwise, looking for a (0,1) signal. In this case, sensor 238 has failed, so a (0,1) signal will not occur and the barrier 50 will continue to move all the way back to the extended position 176. The control system, having not ever received the proper (0,1) signal, will not allow the platform to be raised.

If instead the sensor 236 fails, the control system will still receive the correct (0,1) signal at the upright position 180, and will move the barrier 50 to the position just past the upright position 180, where the control system receives a (0,0) signal and stops the barrier 50. The control system then moves the barrier 50 counterclockwise until it receives a (0,1) signal, stopping the barrier in the upright position 180.

In the event that both sensors 236 and 238 fail during movement of the barrier from extended position 176 to upright position 180, the control system will stop barrier 50 at whatever point the double failure occurs, since it will receive a (0,0) signal. The control system then moves the barrier 50 back the other way searching for the (0,1) sensor signal, which will not occur. Thus the barrier 50 will move counterclockwise back to the extended position 176. The control system, having not ever received the proper (0,1) signal, will not allow the platform to be raised. Thus, in all three possible cases of sensor failure, the control system prevents the barrier 50 from trapping or crushing a person or object located on the platform.

As mentioned above, the wheelchair platform 26 also includes a movable inner barrier 52, as illustrated in FIGS. 4 and 12. The outer edge of the inner barrier 52 is rotatably mounted to the inner edge of the platform 26 using the hinge 184. As was illustrated in FIG. 4, the inner barrier 52 is movable from a fully retracted position 256, to an upright position 188, to a fully extended position 186. In its filly upright position 188, the inner barrier 52 prevents a wheelchair from moving off the inner edge of the wheelchair platform 26. In its fully extended position 186, the inner barrier 52 forms a bridge between the wheelchair platform 26 and the stairs 124 of the bus on which the lift 20 is mounted so that a wheelchair may exit the wheelchair lift and enter the interior of the bus 124b or other vehicle.

As shown in FIG. 12, the inner barrier 52 is actuated using a hydraulic cylinder 190 that is connected to the control mechanism by hydraulic lines 192 and 194. The rod 196 of the hydraulic cylinder 190 is connected to a hinge mechanism 198 that actuates the inner barrier 52. The hinge mechanism 198 may be similar to the hinge mechanism 160 used to actuate the outer barrier 50. In a manner similar to that used on the outer barrier 50, it may be advantageous for the control system to include a pressure relief valve (not shown) that allows the inner barrier 52 to absorb part of the energy of a collision between a wheelchair and the inner barrier 52.

In a manner similar to that described with respect to the outer barrier 50, the inner barrier 52 includes a positional indication system consisting of two proximity sensors 244 and 246 (one sensor is shown in FIG. 12, the other sensor is mounted directly beneath sensor 244) and mounted on the support frame 156, and a proximity plate 242 mounted on the rod 196 such that the plate 242 moves outward and inward along with the rod 196. The two proximity sensors 244 and 246 and proximity plate 242 function in a manner similar to the proximity sensors 236 and 238 and proximity plate 240 described above with respect to the outer barrier 50 and are used to provide a digital indication of the various positions of the inner barrier 52. Each sensor 244 or 246 provides a "0" or "1" signal depending on whether part of the proximity plate 242 which is formed from a target material is located in front of the sensor. A "1" signal is given from a sensor which has the target material in front of it. The information from the sensors is thus digital in nature.

In addition to the foldable barriers 50 and 52, the wheelchair platform 26 also includes opposing hand rails 250 (FIG. 2) that extend upward from the opposing edges of the wheelchair platform. The hand rails 250 may be placed within one of multiple recesses 252 located on the side of the wheelchair platform 26. The multiple recesses 252 allow the position of the hand rails 250 to be adjusted. This adjustment allows the wheelchair lift 20 to be used in different vehicles while still allowing the hand rails 250 to be positioned so that they do not interfere with the steps or doors of the vehicle. The hand rails 250 are secured within the recesses 252 by pins that extend through the hand rails 252 and holes 260 (FIG. 4) in the walls of the recesses. The hand rails 250 could also be secured within the recesses by other suitable fastening methods.

The general operation of the wheelchair lift 20 will now be described. During standard operation of the bus or other vehicle on which the wheelchair lift 20 is mounted, the wheelchair lift 20 is maintained in its stowed position (FIG. 2) underneath the bus. When the vehicle stops in order to load a wheelchair onto the vehicle, the wheelchair lift 20 moves as follows. First, the platform frame 24 is moved to its fully extended position by the belt drive mechanism 32. Once extended, the outer and inner barriers 50 and 52 are moved to upright positions by hydraulic actuators 152 and 190 (FIG. 12). As shown in phantom in FIG. 4, the platform 26 is then lowered into contact with the ground by arms 28 and 30 which are actuated by drive links 46 (FIG. 3) which are actuated by hydraulic actuators 48. As the outer edge of a wheelchair platform 26 nears the sidewalk, wheels 258 (FIG. 4) located at the front edge of the wheelchair platform 26 contact the ground and allow the wheelchair platform 26 to move in and out on the ground slightly as the vehicle tilts or rolls due to vehicle suspension movement during operation of the wheelchair lift. Once the wheelchair platform 26 contacts the ground, the control system stops the downward movement of the wheelchair platform 26. The outer barrier 50 is then moved to its fully extended position 176 as illustrated in FIG. 5.

Once the wheelchair lift is fully deployed, a wheelchair occupant moves his or her wheelchair up the ramp formed by the outer barrier 50 onto the wheelchair platform 26. After the wheelchair is on the wheelchair platform 26, the outer barrier 50 moves to its upright position 180, as shown in FIG. 5. As shown in FIG. 4, the wheelchair platform 26 is then raised to its fully raised position by the arms 28 and 30 and drive links 46 and hydraulic actuators 48. Once the upper surface of the wheelchair platform 26 lies in the same plane as the upper surface of the stairs 124*b* (shown in phantom in FIG. 4), the inner barrier 52 moves to its fully extended position 186 such that the inner barrier 52 bridges the gap between the wheelchair platform 26 and the stairs 124*b*. The wheelchair occupant may then move the wheelchair into the interior of the bus or other vehicle over the inner barrier 52. In order for a wheelchair to be lowered from the interior of the bus to the sidewalk, the wheelchair lift operates in reverse order. After loading or unloading a wheelchair, the wheelchair platform 26, barriers 50 and 52, and platform frame 24, move to their fully retracted and stowed position, as illustrated in FIG. 2.

Figure 6A:
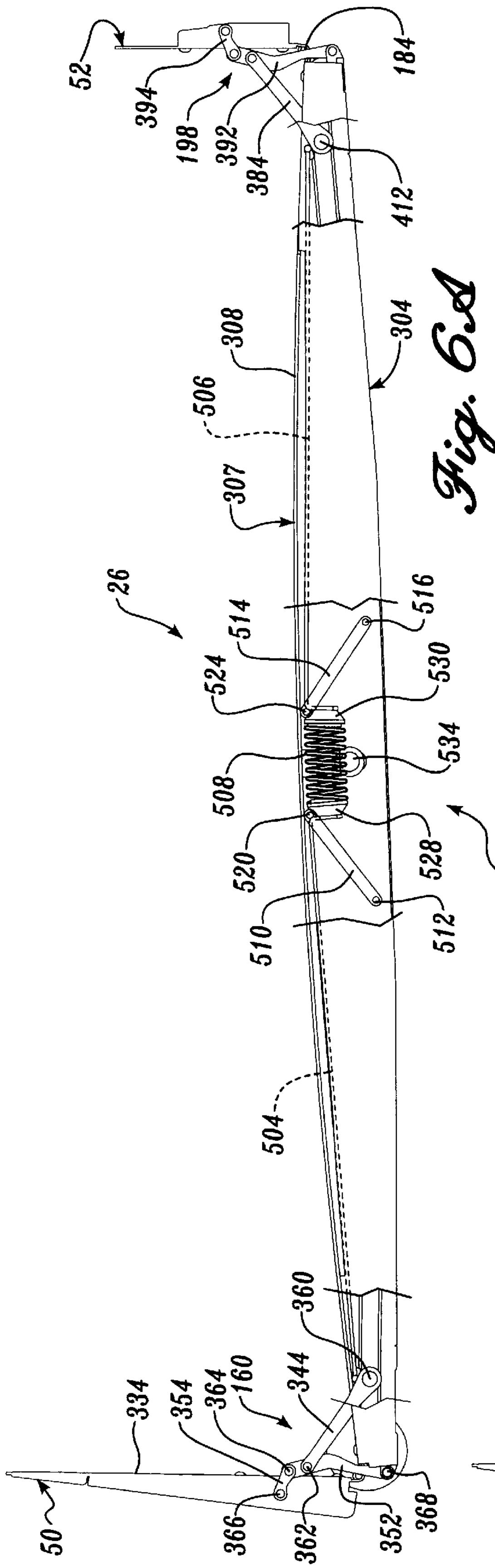
FIG. 6A is a side partial cutaway view of an alternate wheelchair platform according to the present invention.

The wheelchair platform 26 is constructed with electrical and mechanical barrier interlocks that prevent the inner or outer wheelchair barriers 50 and 52 from operating in ways which could alter the barriers to fold inward onto an occupant or other item located on the wheelchair platform. The preferred embodiment of the wheelchair platform 26 is illustrated in FIGS. 6–12. As seen in FIG. 6A, the wheelchair platform 26 includes a structure frame generally designated as 304, a deck 307, the outer barrier 50, inner barrier 52, outer and inner hinge mechanisms 160 and 198, the hydraulic cylinders 152 and 190, and the rods 158 and 196, along with ground interlock mechanism 440 (FIG. 7A), and a movable deck platform interlock mechanism 502.

In the preferred embodiment, the outer barrier linkage utilizes a plurality of flat bar linkages including connecting links 344, control links 352, and floating links 354 to distribute the loads unilaterally throughout the linkage. Although the preferred embodiment of the hinge mechanism 160 is described below, the hinge mechanism could be any suitable hinge mechanism capable of moving the outer barrier 50 through approximately 180° of movement so that the outer barrier may be moved from between its extended and retracted positions.

As described above, the outer barrier 50 is actuated by the outer hinge mechanism 160 and hydraulic cylinder 152. The outer end of the rod 158 of the hydraulic cylinder 152 is mounted to the inner end of a clevis 340 (FIG. 12) by a cylinder nut 342. The outer end of the clevis 340 is rotatably attached to the inner end of four connecting links 344 (FIGS. 7B and 12) using a clevis pin 360. Plastic self lubricating bushings are used in the connecting links 344 to provide low friction and to serve as a dielectric to minimize corrosion between the connecting links 344 and the clevis pin 360. The outer ends of the connecting links 344 are rotatably attached (FIGS. 7A and 12) to four control links 352 near their outer ends using a pivot pin 362 (FIGS. 7A and 12).

Figure 7A:
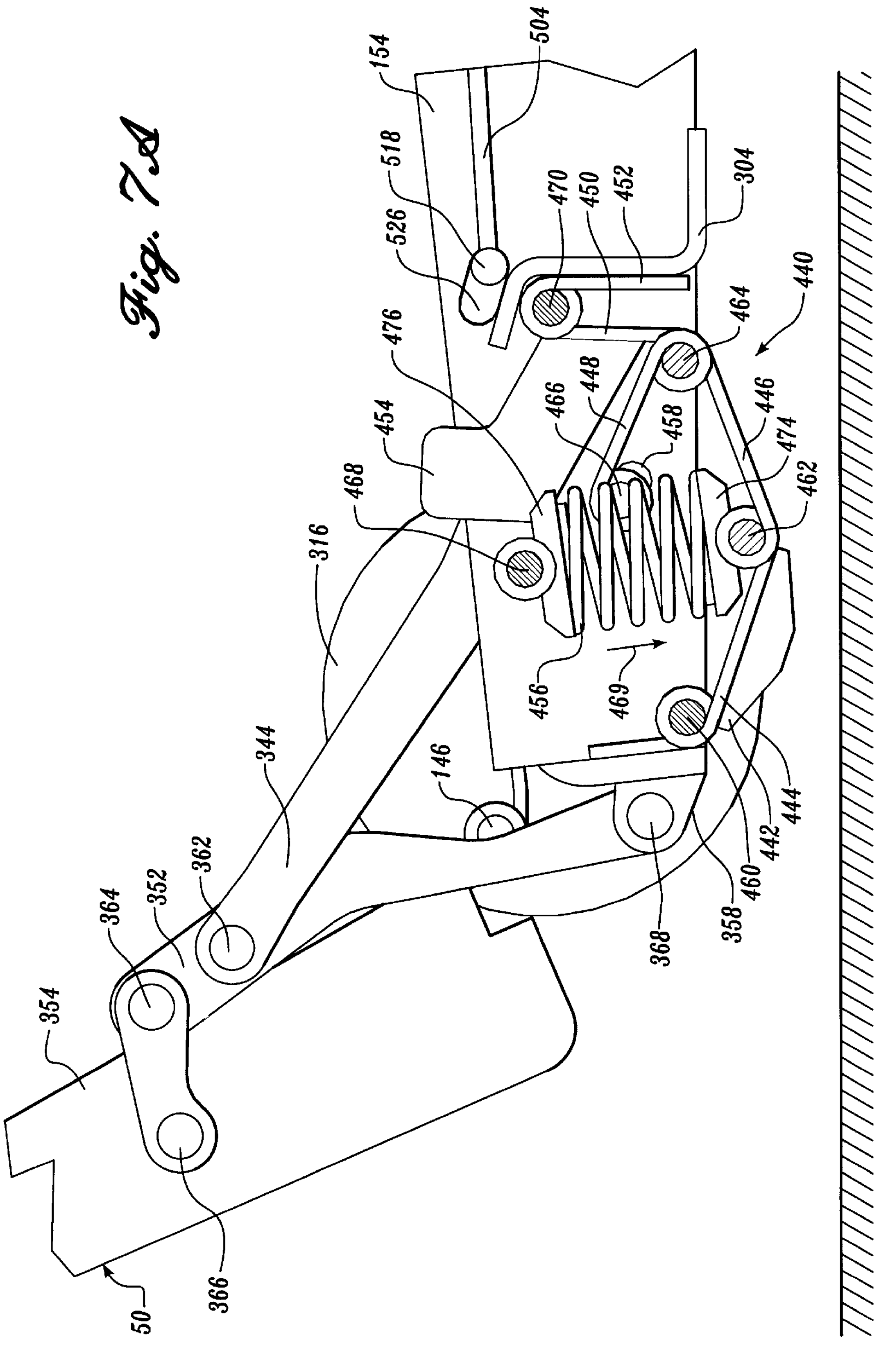
FIG. 7A is a side partial cutaway view of the outer wheelchair barrier and ground interlock mechanism of the wheelchair platform of FIG. 6A.
Figure 7B:
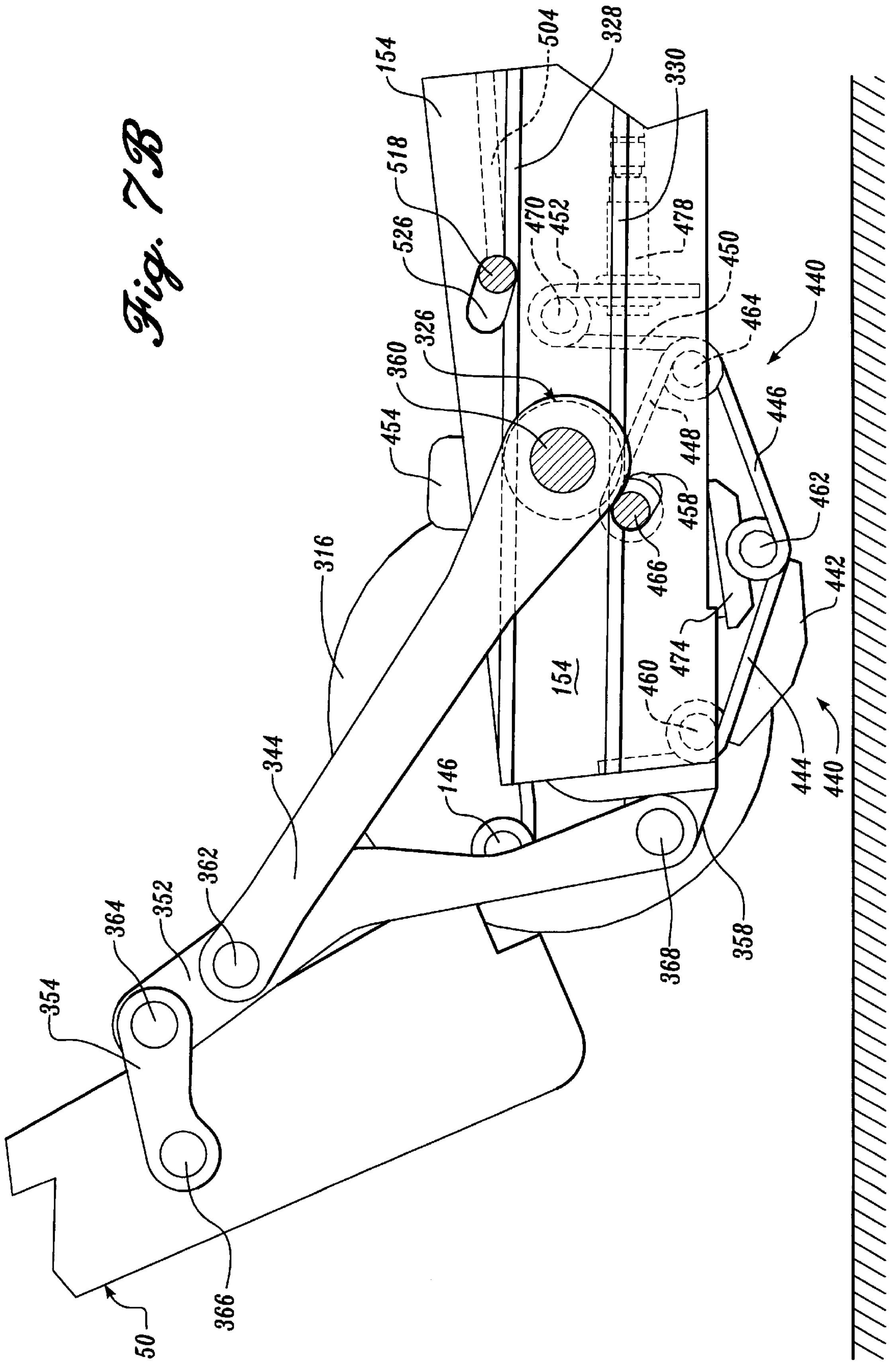
FIG. 7B is a side partial cutaway view of the outer wheelchair barrier and ground interlock illustrated with the platform lifted off the ground.
Figure 8A:
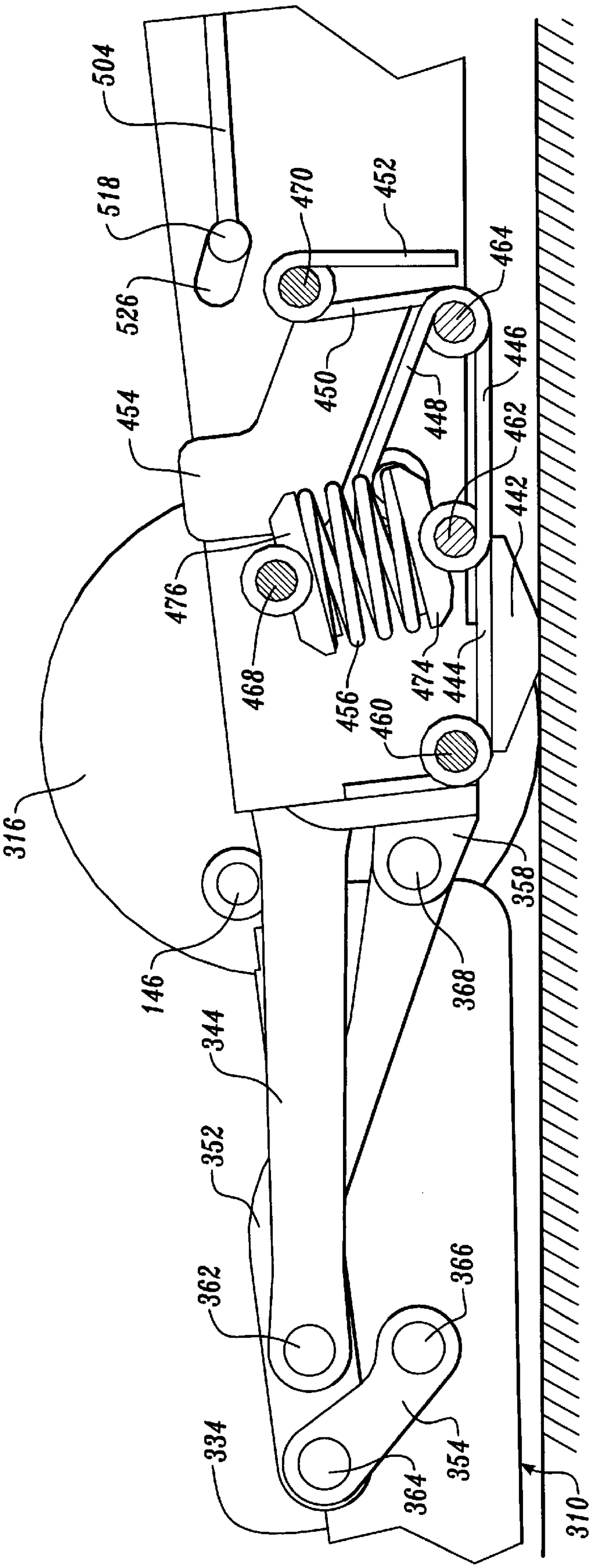
FIG. 8A is a side partial cutaway view of the outer wheelchair barrier and ground interlock in the extended position.
Figure 8B:
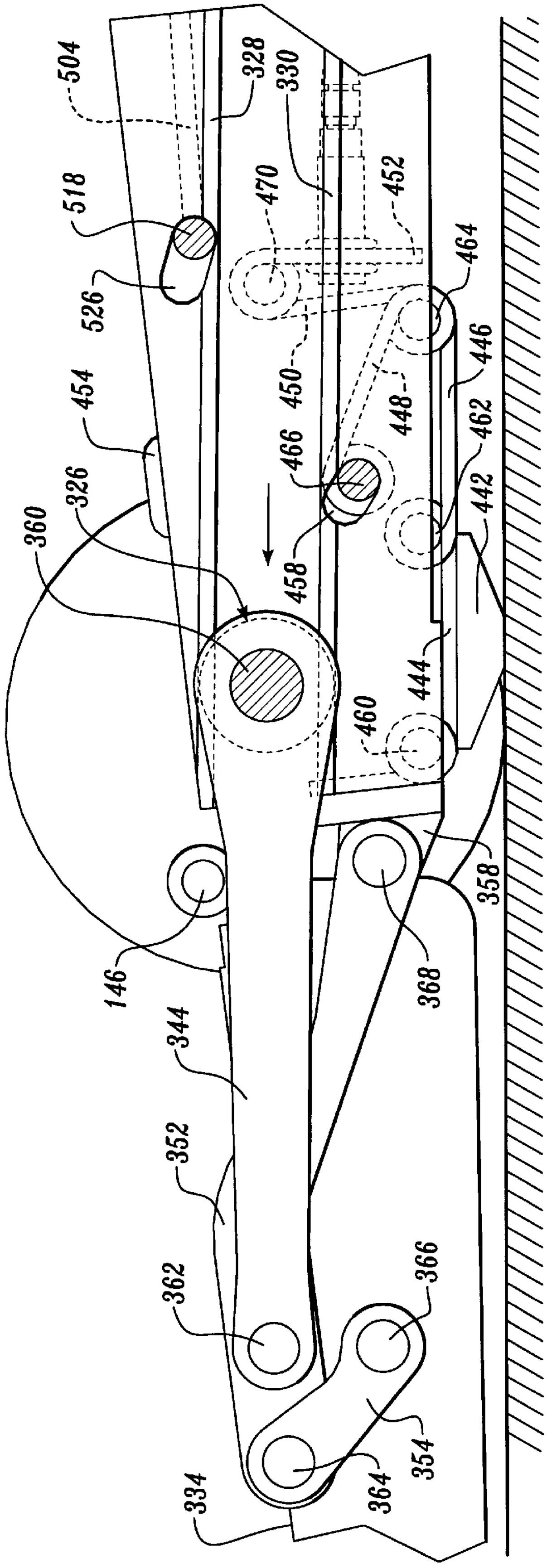
FIG. 8B is another side partial cutaway view of the outer wheelchair barrier and ground interlock in the extended position.
Figure 9A:
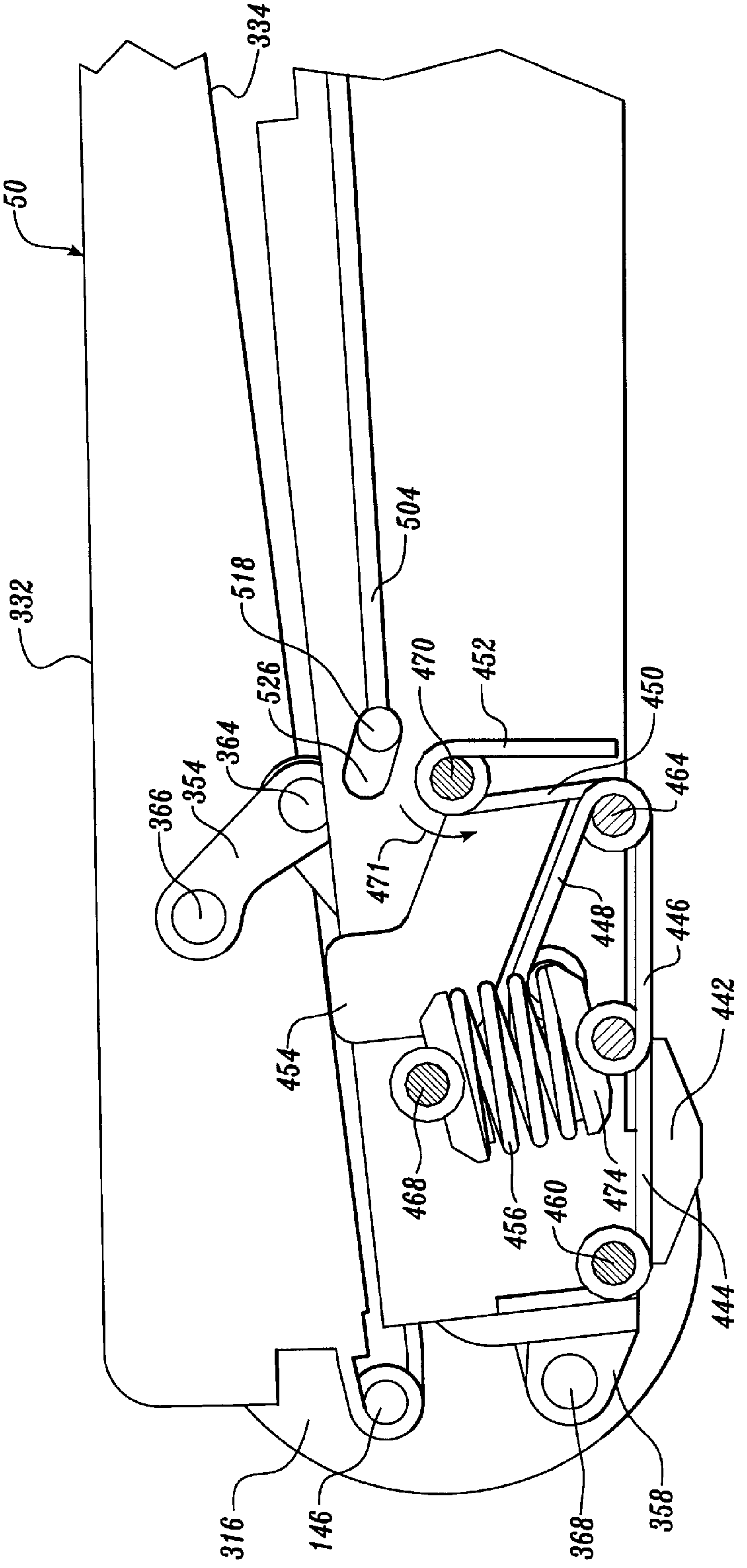
FIG. 9A is a side partial cutaway view of the outer wheelchair barrier and ground interlock in the retracted position.
Figure 9B:
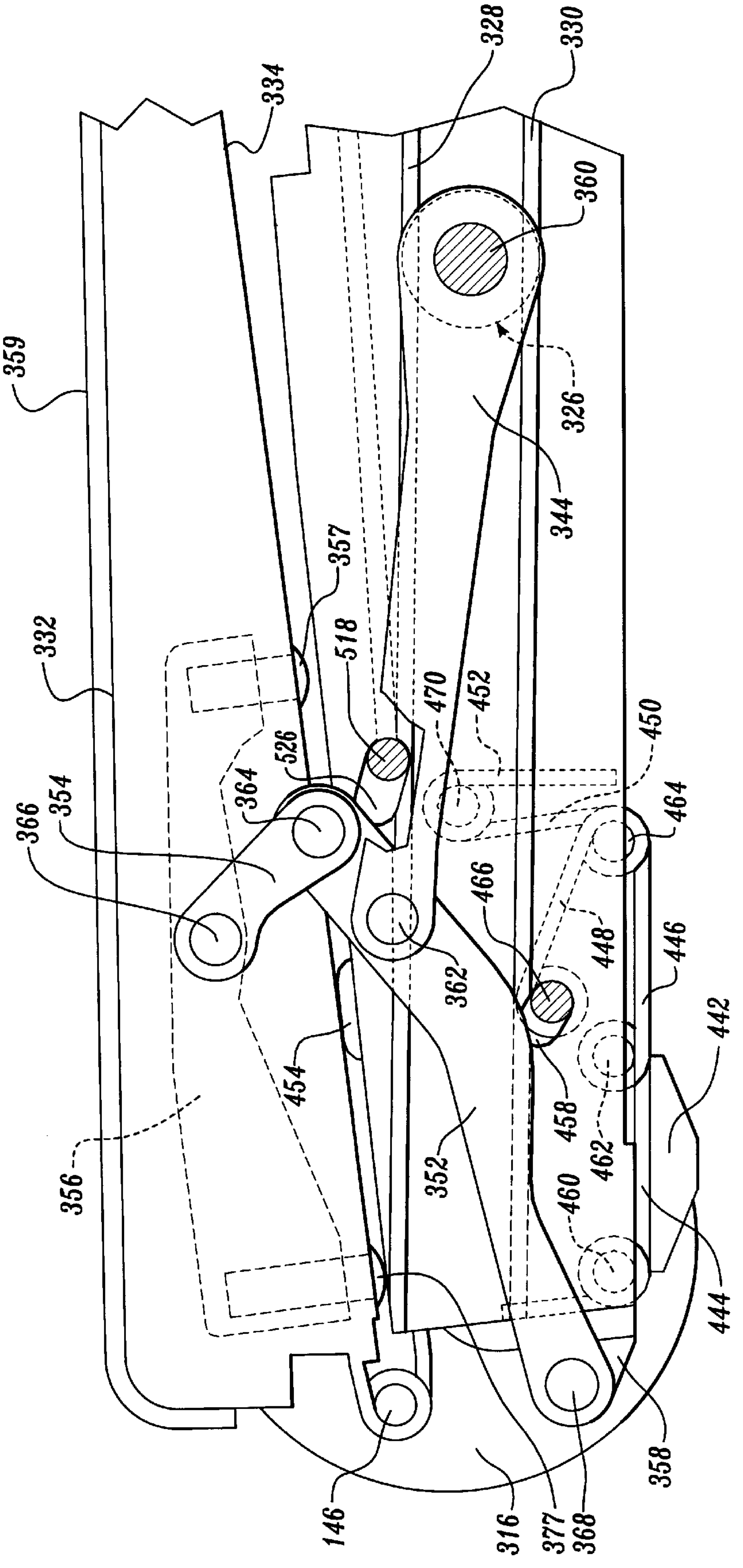
FIG. 9B is another side partial cutaway view of the outer wheelchair barrier and ground interlock in the retracted position.

As the cylinder rod 158 (FIG. 16) moves inward from its outermost position, the barrier linkage 160 moves the outer barrier 50 from a fully extended position, as shown in FIGS. 8A and 8B, to an upright position, as shown in FIGS. 7A and 8B, to a fully retracted position, as shown in FIGS. 9A and 9B. As seen in FIGS. 7B and 12, the four control links 352 are also rotatably attached on their outer ends to the inner ends of the four floating links 354 using a pivot pin 364 (FIG. 8B). As illustrated in FIG. 8B, the outer ends of the four control links 352 are rotatably attached to the outer ends of the four connecting links 344 inward from the attachment point of the floating links 354 at pivot pin 362. The inner ends of the control links 352 are rotatably attached to a frame lug 358 located on the outer end of the wheelchair platform 26 using pivot pin 368. Snap rings (not shown) on the ends each of the pivot pins 362, 364, and 368 are used to maintain the pivot pins and respective control links in place. Bushings or other types of bearing are used in the various links to minimize the friction between the links and the pivot pins.

The outer ends of the four floating links 354 are rotatably attached to a midpoint of the outer barrier 50 at a pivot block 356 (FIG. 9B) by a pivot pin 366. The pivot block 356 is releasably fastened to the outer barrier 50 using capscrews 357 that extend through the upper surface 334 of the outer barrier and are received in the pivot block 356. Attaching the pivot block 356 to the outer barrier 50 using capscrews 357 allows the pivot block to be removed or replaced easily. After removing the capscrews, the pivot block 356 may be removed from barrier 50 through an opening (not shown) in the inner end of the outer barrier 50. Removing the pivot block 356 through the opening in the end of the barrier allows the pivot block 356 to be removed without removing a step tread 359 covering the lower surface 332 of the outer barrier 50. This configuration helps to prevent possible damage to the step tread 359 and also eases disassembly of the outer barrier 50 and linkage 160.

The attachment between the connecting links 344 and the structure frame 304 will now be discussed in more detail in reference to FIGS. 7B and 12. Clevis rollers 326 are rotatably attached to the outer ends of the clevis pin 360. The clevis rollers 326 are captured within and roll in upper and lower tracks 328 and 330 (FIG. 11B) which are fixed to and extend inward from both of the parallel frames 154 and 156. As discussed above, the frames 154 and 156 are located on either side of the pivot pin 360 and control links 344 and extend over the length of the wheelchair platform. The tracks 328 and 330 guide the clevis rollers 326 in and out as the rod 158 moves the clevis 340 and clevis pin 360 inward and outward.

Figure 10A:
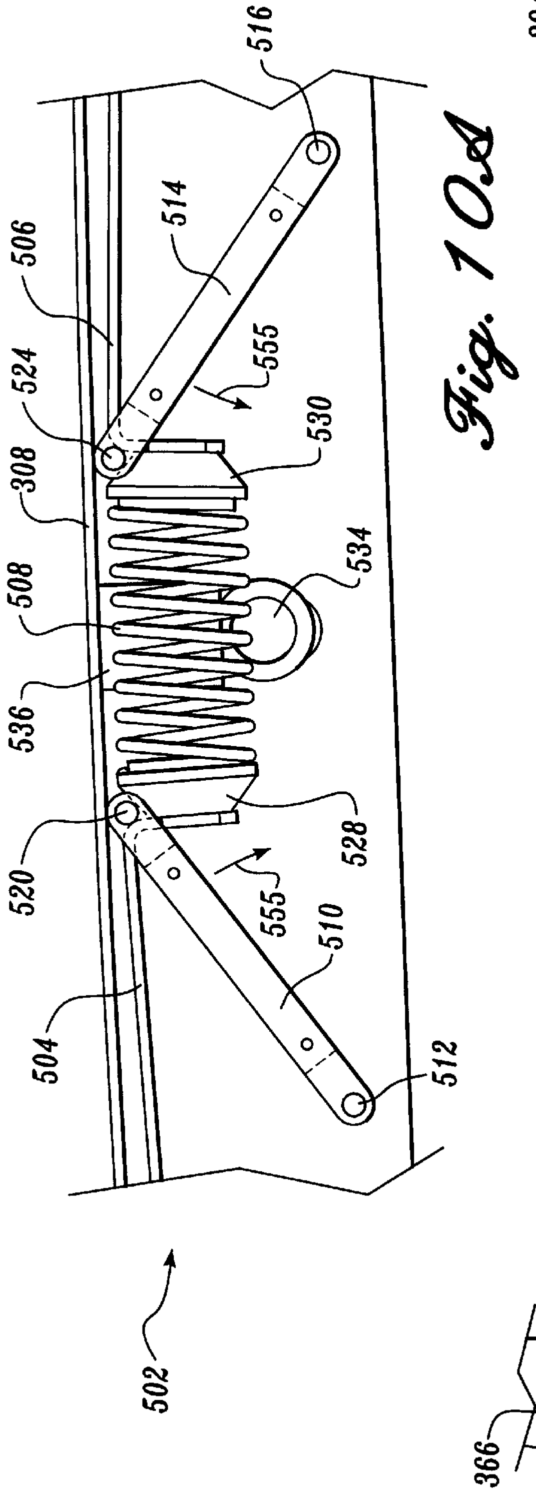
FIG. 10A is an enlarged partial cutaway view of the middle section of the wheelchair lift platform of FIG. 6A.
Figure 10C:
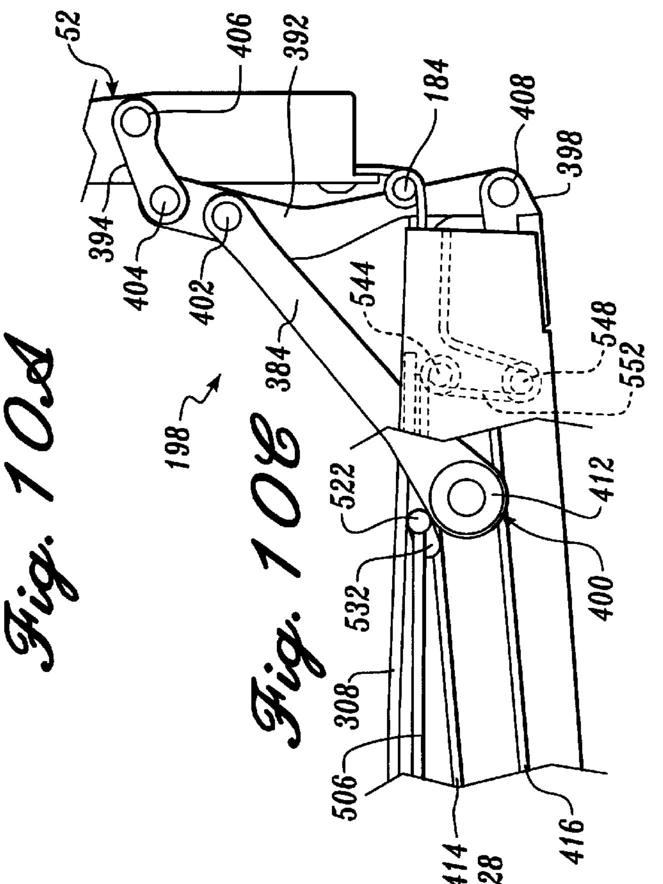
FIG. 10C is an enlarged partial cutaway view of the inner section of the wheelchair lift platform of FIG. 6A in an unlocked position.

As discussed above, the wheelchair platform 26 also includes a movable inner barrier 52, as seen in FIGS. 6A and B. The outer edge of inner barrier 52 is rotatably mounted to the inner edge of the deck 307 over its width by the hinge 184 (FIG. 10C). The inner barrier 52 is movable between a fully extended position (FIG. 4), to an upright position, to a fully retracted position.

As shown in FIG. 12, the inner barrier 52 is actuated similarly to the outer barrier 50 using the hydraulic cylinder 190 which is connected to the control mechanism by hydraulic lines 192 and 194. The inner end of the rod 196 is connected to the outer end of a clevis 380 using a cylinder nut 382. The inner end of the end of the clevis 380 is rotatably attached to the outer end of the hinge mechanism 198 using a clevis pin 400 (FIG. 10C). The hinge mechanism 198 is mechanically similar to and operates in a similar manner to the barrier linkage 160 used to actuate the outer barrier 50.

As shown in FIG. 10C and 12, the hinge mechanism 198 includes four parallel connecting links 384, four control links 392, four floating links 394 and a releasable pivot block (not shown). The connecting links 384, control links 392, floating links 394 and pivot block are assembled and operate in a similar manner as previously described with respect to the barrier linkage 160. Thus, the outer ends of the connecting links 384 are rotatably attached to the inner end of the clevis 380 using a clevis pin 400. The inner ends of the connecting links 384 are rotatably attached to the control links 392 near their inner ends using a pivot pin 402 (FIG. 10C). The inner ends of the control links 392, outward from the attachment points at which the connecting links 384 attach at pivot pin 402, are also rotatably attached to the outer ends of the floating links 394 using a pivot pin 404. The outer ends of the control links 392 are rotatably attached to a frame lug 398 using a pivot pin 408. The frame lug 398 is attached to the inner end of the wheelchair platform 26. The inner ends of the floating links 394 are rotatably attached to the inner barrier 52 at the pivot block using a pivot pin 406.

Clevis rollers 412 are rotatably attached to the outer ends of the clevis pin 400. The clevis rollers are captured within and roll in upper and lower tracks 414 and 416 which are fixed to and extend inward from the parallel frames 154 and 156 located on either side of the clevis pin 400 and hinge mechanism 198. The upper and lower tracks 414 and 416 capture and guide the clevis rollers 412 in and out as the rod 196 (FIG. 12) moves in and out.

As described above, it is important that the wheelchair lift incorporate features to prevent the inner and outer wheelchair barriers 50 and 52 from extending or retracting improperly. The preferred embodiment of the wheelchair lift incorporates the electronic position control system, namely the respective proximity plates 240 and 242 and proximity sensors 236, 238, 244, and 246 in order to provide the control system data regarding the position of the outer and inner barriers 50 and 52.

In addition to electronic controls features, the preferred embodiment also includes a ground interlock mechanism 440 (FIGS. 7–9) and a platform interlock mechanism 502 (FIGS. 6–12). The ground interlock mechanism 440 and platform interlock mechanism 502 are also provided to mechanically limit improper movement of the outer and inner barriers 50 and 52. The ground interlock mechanism 340 and platform interlock mechanism 502 are used to prevent the inner and outer barriers 50 and 52 from moving to their fully extended or fully retracted positions at an improper time. For example, it is important that the outer barrier 50 not move to its fully extended position while a wheelchair is on the platform and the platform is in motion.

As shown in FIGS. 7A and 7B, the ground interlock mechanism 440 includes a skid bar 442, an input leaf 444, a coupler leaf 446, an interlock leaf 448, an output leaf 450, a fixed leaf 452, a stow lever 454, return springs 456, and an interlock pin 466. Skid bar 442, input leaf 444, coupler leaf 446, interlock leaf 448, output leaf 450 and fixed leaf 452 are generally planar and extend partially across the width of the wheelchair platform 26. The input leaf 444 is rotatably mounted on its outer edge to the outer edge of the wheelchair platform 26 using a pivot pin 460. The inner edge of the input leaf 444 is rotatably attached to the outer edge of the coupler leaf 446 using a pivot pin 462. The wear resistant skid bar 442 is mounted to the bottom surface of the input leaf 444 using fasteners such as rivets (not shown). As discussed below, the skid bar 442 contacts the ground during operation of the wheelchair lift and serves as a protective cover for the bottom of the input leaf 444.

The inner edge of the coupler leaf 446 is rotatably attached to both the inner edge of the interlock leaf 448 and the outer edge of the output leaf 450 using a pivot pin 464. The upper edge of output leaf 450 is rotatably attached to the upper edge of the fixed leaf 452 using a pivot pin 470. The outer edge of the interlock leaf 448 is rotatably attached to the interlock pin 466. The interlock pin 466 is slidably mounted within interlock slots 458. The interlock slots 458 extend through the frames 154 and 156 on which the rails containing the clevis rollers 326 are mounted.

The slots 458 extend at an angle such that the outer edges of the slots are higher than the inner edges of the slots. As shown in FIG. 7B, the outer edge of each slot 458 is positioned so that when the interlock pin 466 is slid all the way to the outer edge of the slot 458, it is moved upward into the path of the clevis rollers 326, thus preventing the clevis rollers from moving outward past the interlock pin 466. As illustrated in FIG. 8B, when the interlock pin 466 is slid inward to the inner edge of the slot 458, it moves downward and is positioned below the clevis rollers 326, thus allowing the clevis rollers, and thus connecting links 344, to move outward past the interlock pin 466.

As illustrated in FIG. 7A, a lower spring keeper 474 seats on the hinge pin 462, connecting the input leaf 444 and the coupler leaf 446. An upper spring keeper 476 is connected to a pivot pin 468 that is connected to the frame of the wheelchair platform 26. The return springs 456 are connected between the upper and lower spring keepers 476 and 474 and provide a biasing force which biases the pivot pin 462 downward, as illustrated in FIG. 7A. In the preferred embodiment, three return springs 456 are placed as shown over the width of the wheelchair platform 26 (FIG. 16).

In the preferred embodiment, the skid bar 442, input leaf 444, coupler leaf 446, and output leaf 450 extend over the majority of the width of the wheelchair platform 26 to both sides of the hinge mechanism 160 (FIG. 16). The interlock leaf 448 (FIG. 16) is actually two separate parts that extend over central areas of the wheelchair platform 26 in front of the forward frame 156 and in back of the rear frame 154. The interlock pins 466 extend slightly beyond the edges of interlock leaves 448 into the respective interlock slots 458 in the frames 156 and 159.

As illustrated in FIGS. 7–9, the pivot pins 460 and 470 are fixed to the frames 154 and 156 and the forward and rear edge of the wheelchair platform 26. This configuration causes the ground interlock mechanism 440 to act as a four bar linkage combined with a slider crank. As illustrated in FIGS. 7A and 7B, when the wheelchair platform 26 is not touching the ground, the ground interlock mechanism 440 is in an unlocked state in which the return springs 456 bias the pivot pin 462 downward away from the pivot pin 468 as illustrated by arrow 469 (FIG. 7A). In its unlocked state the biasing action of the return springs 456 causes the lower end of the output leaf 450 to be biased outward by the downward movement of the coupler leaf 446. This in turn moves the interlock leaves 448 and thus interlock pins 466 outward and upward so that the interlock pins 466 are moved upward to the outer edge of the interlock slots 458. When the interlock pins 466 are located at the outer edges of the interlock slots 458, they prevent the clevis rollers 326 from moving outward past the interlock pins 466, as shown in FIG. 7B. The ground interlock mechanism 440 thus prevents the outer barrier 50 from moving beyond an upright position (FIG. 7B) when the wheelchair platform 26 is not contacting the ground. Thus, the ground interlock mechanism 440 prevents a wheelchair from moving off of the outer end of the wheelchair platform 26 when the wheelchair platform is not contacting the ground.

As the wheelchair platform 26 moves downward to where the skidbar 442 contacts the ground (FIGS. 8A and 8B), the skidbar 442 is pressed upward, causing the input leaf 444 to pivot counterclockwise about hinge pin 460. The counterclockwise rotation of the input leaf 444 causes the inner end of the input leaf 444, and thus the outer end of the coupler leaf 446 and pivot pin 462, to move upward against the biasing force of the return springs 456. As the pivot pin 462 moves upward, it causes the inner end of the coupler leaf 446 and pivot pin 464 to move inward, as illustrated in FIG. 8A. The inward movement of the pivot pin 464 causes the interlock leaves 448 to move inward, thus sliding the interlock pins 466 (FIG. 8B) downward and inward to the inner edges of the interlock slots 458. As the interlock pins 466 move downward, the ground interlock mechanism 440 moves to its unlocked position in which the interlock pins 466 are moved out of the way of the clevis rollers 326, thus allowing the outer barrier 50 to be moved to its fully extended position, as illustrated in FIGS. 8A and 8B.

In addition to mechanically blocking the clevis rollers 326 and connecting links 344, when the ground interlock mechanism 440 is in the locked position, the interlock mechanism also includes an electronic sensor 478 (FIGS. 7B and 8B). The electronic sensor 478 sends a signal to the control system to prevent extension of the outer barrier 50 until the interlock mechanism 440 has contacted the ground. As shown in FIGS. 7B and 8B, the electronic sensor 478 is mounted to the fixed leaf 452 and faces the inner side of the output leaf 450. The sensor 478 operates such that when the output leaf 450 rotates counterclockwise about the pivot pin 470 toward the fixed leaf and sensor 478, the sensor 478 detects the position of the output leaf 450 and sends a signal to the control system. The signal provides the control system an indication that it is allowed to move the outer barrier 50 to the extended position. Until the sensor 478 provides the control system a proper signal, the control system is both mechanically and electrically prevented from moving the outer barrier 50 to the fully extended position.

As illustrated in FIGS. 7A and 7B, when the wheelchair platform 26 is not contacting the ground, part of the ground interlock mechanism 440 hangs below the lower surface of the wheelchair platform. It is desirable when the wheelchair platform 26 is to be stowed under the bus, to make the ground interlock mechanism 440 as compact as possible to save space and help prevent damage to the interlock mechanism 440 during retraction of the platform. Thus, it is beneficial to move the interlock mechanism 440 to its locked position in which it folds approximately flat with the lower surface of the wheelchair platform 26 (FIGS. 9A and 9B) when the platform is being stored. The ground interlock mechanism 444 includes a stow lever 454 to move the interlock mechanism to its locked position when the outer barrier is folded flat and the wheelchair platform is retracted.

The stow lever 454 is attached to the outer surface of the output leaf 450. The stow lever 454 extends outward and upward from the output leaf 450 such that the outer end of the stow lever extends slightly above the upper surface of the wheelchair platform 26 when the interlock mechanism 440 is in its locked position, as illustrated in FIGS. 7A and 7B. As illustrated in FIGS. 9A and 9B, when the outer barrier 50 is moved into the fully retracted/stowed position for preparation of the wheelchair platform being stored under the bus, the top of the stow lever 454 is contacted by and pushed downward by the upper surface of the outer barrier 50. As the top of the stow lever 454 is pushed downward by the outer barrier 50, the output leaf 450 rotates counterclockwise about pivot pin 470 as shown by arrow 471. The rotation of the counterclockwise output leaf 450 moves the coupler leaf 446 and input leaf 444 inward, causing the outer end of the coupler leaf 446 to hinge upwards clockwise about pivot pin 462, and also causing the inner end of the input leaf 444 to hinge upwards counterclockwise about fixed pivot pin 460, against the biasing force of the return springs 456. Thus, the ground interlock mechanism 440 is placed in the folded, unlocked position in which interlock mechanism 440 is most compact and least susceptible to damage.

In addition to the ground interlock mechanism 440, the preferred embodiment of the wheelchair platform 26 also includes the platform interlock mechanism 502 to prevent the outer and inner barriers 50 and 52 from moving/folding toward their retracted positions onto a passenger or other article located on the wheelchair platform. The operation of the platform interlock mechanism 502 is shown with reference to FIGS. 6–12. The platform interlock mechanism 502 includes a floating or deformable deck plate 308 (FIG. 6A), outer and inner interlock links 504 and 506, outer and inner interlock pins 518 and 522 (FIGS. 10B and 10C), outer and inner control levers 510 and 514, return springs 508 and an electronic sensor 534.

The platform interlock mechanism 502 operates in a manner similar to the ground interlock mechanism 440 in that it uses outer and inner interlock pins 518 and 522 (FIGS. 10B and 10C) to block the path of the clevis rollers 326 and 412 so that the inner and outer barriers 50 and 52 are mechanically prevented from moving/folding toward their retracted positions onto a passenger, as described in detail below.

Figure 6B:
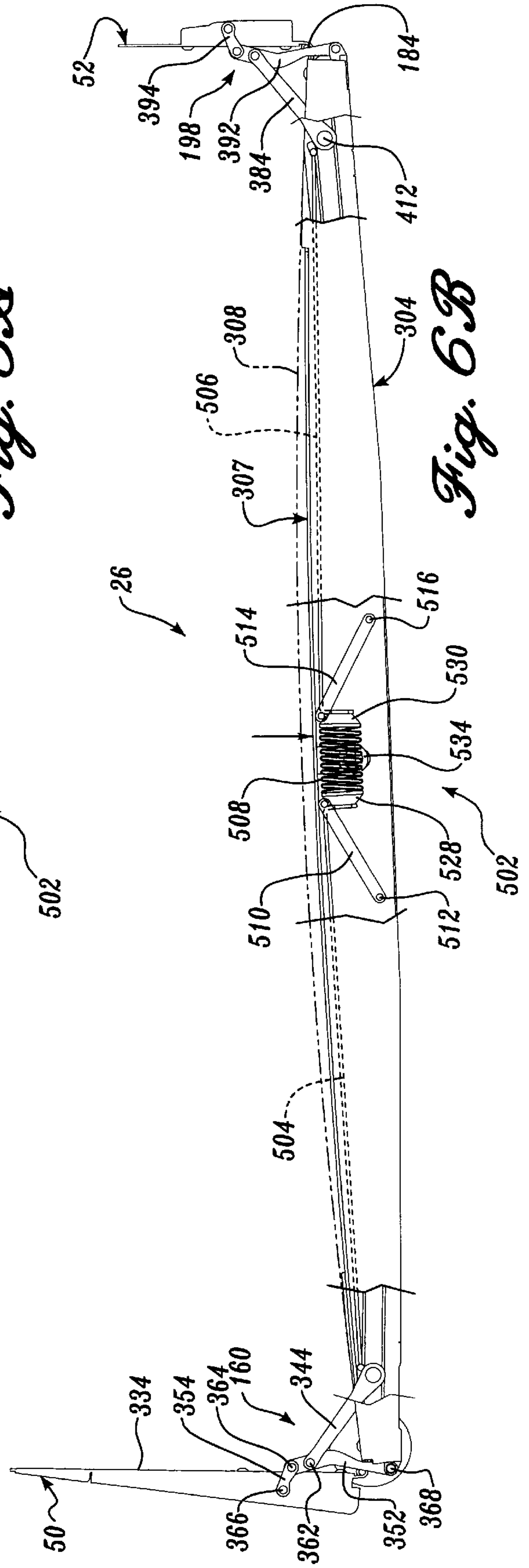
FIG. 6B is a side partial cutaway view of the wheelchair platform of FIG. 6A in a depressed position.

As shown in FIGS. 6A and 6B, the floating deck plate 308 is formed with a slight upward camber, which allows the deck plate 308 to deform and act as a large leaf spring that is rotatably attached along its opposing ends to the inner and outer ends of the platform 26 by an outer pivot pin 542 (FIG. 10B), and on the inner end to the upper edge of a pin leaf 552 using a pivot pin 544 (FIG. 10C). The lower end of the pin leaf 552 is rotatably connected to the wheelchair platform frame using a pivot pin 548. The use of the cambered deck plate 308 pivoted at the outer and inner ends allows the deck plate to deflect downward when a weight is placed on the deck plate as described in more detail below.

The center of the deck plate is supported by inner and outer interlock links 504 and 506. A pair of inner and a pair of outer interlock links 504 and 506 are mounted below the deck plate and move upward or downward and inward and outward as the deck plate deflects upward or downward as described below. As shown in FIG. 10A, the control levers 510 and 514 are positioned underneath the deck plate 308 near the center of the wheelchair platform 26. As shown in FIGS. 10A and 12, the upper ends of a pair of outer control levers 510 are pivotally connected to the inner ends of each outer interlock link 504 and the upper ends of a pair of inner control levers 514 are pivotably connected to the outer end of each inner interlock link 506. One control lever 510 or 514 is located on either side of each interlock link 504 and 506, respectively. The lower ends of the outer control levers 510 are pivotably connected to the platform frame 304 using pivot pins 512 while the lower ends of the inner control levers 514 are pivotably connected to the platform frame 304 using pivot pins 516. The upper ends of the outer control levers 510 are rotatably connected to the inner ends of the outer interlock links 504 using pivot pins 520. The upper ends of the inner control levers 514 are pivotally connected to the outer ends of the inner interlock links 506 using pivot pins 524.

A return spring 508 is connected between the inner end of each outer interlock link 504 and the outer end of each matching inner interlock link 506 using outer and inner spring retainers 528 and 530, respectively (FIG. 10A). The spring retainers 528 and 530 are connected to walls that extend downward from the respective ends of the inner and outer interlock links 504 and 506. The return springs 508 bias the inner and outer interlock links 504 and 506 apart, thus biasing the upper ends of the control links 510 and 514 upward against the lower surface of the deck plate 308.

Figure 10B:
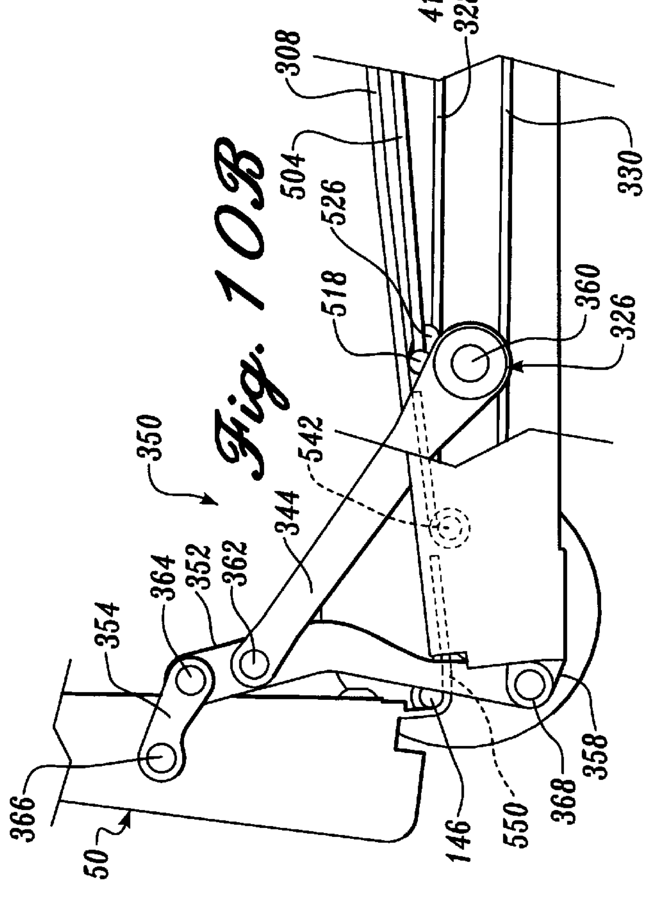
FIG. 10B is an enlarged partial cutaway view of the outer section of the wheelchair lift platform of FIG. 6A in an unlocked position.
Figures 11A, 11B, 11C:
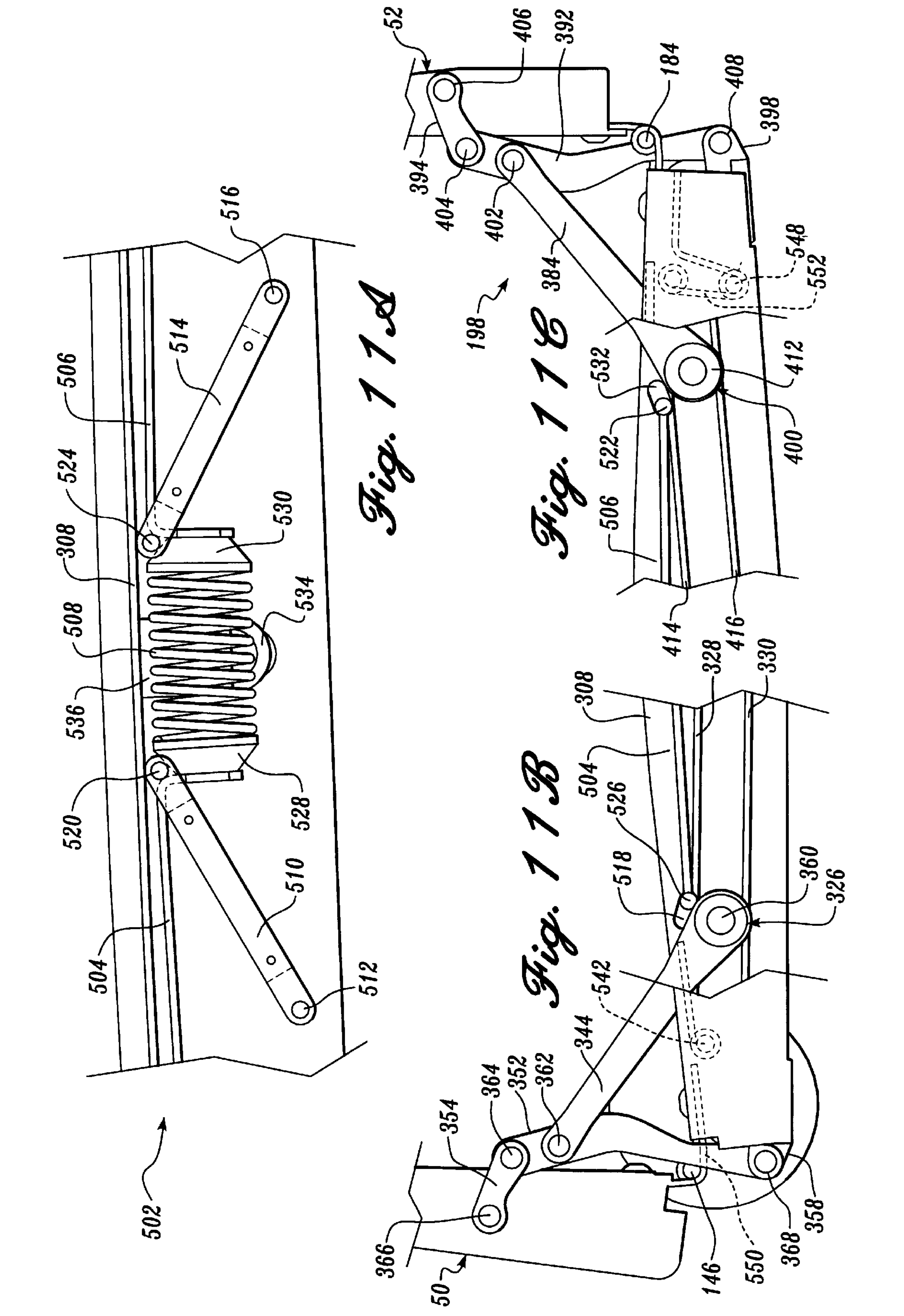
FIG. 11A is an enlarged partial cutaway view of the middle section of the wheelchair lift platform of FIG. 6B in a depressed position.
FIG. 11B is an enlarged partial cutaway view of the outer section of the wheelchair lift platform of FIG. 6B in a locked position.
FIG. 11C is an enlarged partial cutaway view of the inner section of the wheelchair lift platform of FIG. 6B in a locked position.

As illustrated in FIG. 10B, the outer ends of the outer interlock links 504 are connected to the interlock pins 518. The interlock pins 518 are slidably mounted within slots 526 that extend through the platform frames 154 and 156 (FIG. 12) on which the rails 328 and 330 containing the clevis rollers 326 are mounted. The slots 526 (FIG. 10B) extend at an angle such that the outer edge of each slot is higher than the inner edge of each slot. As shown in FIGS. 10B and 11B, the inner edge of each slot 506 is positioned so that when the interlock pin 518 is slid downward all the way to the inner edge of the slot 526, the outer interlock pin 518 prevents the clevis rollers 326 from moving inward past the interlock pin 518. However, as illustrated in FIG. 10B, when the outer interlock pins 518 are slid outward and upward to the outer edge of the slot 526, the outer interlock pins 518 are positioned above the clevis roller 326, thus allowing the clevis rollers, and thus connecting links 344, to move inward past the outer interlock pins 518.

As illustrated in FIG. 10C, the inner end of each inner interlock link 506 is connected to an interlock pin 522. Each inner interlock pin 522 is slidably mounted within a slot 532 that extends through one of the platform frames 154 and 156 (FIG. 12) on which the rails 414 and 416 containing the clevis rollers 412 are mounted. Each slot 532 extends at an angle such that the inner edge of the slot is higher than the outer edge of the slot. As shown in FIG. 11C, the outer edge of the slot 532 is positioned so that when the interlock pin 522 is slid outward and downward to the outer edge of the slot 532, the interlock pin 522 prevents the clevis rollers 412 from moving outward past the interlock pin 522. However, as illustrated in FIG. 10C, when the interlock pin 522 is slid inward and upward to the inner edge of the slot 532, the interlock pin 522 is positioned above the clevis rollers 412, thus allowing the clevis rollers 412, and thus the connecting links 384, to move outward past the interlock pin 522.

FIGS. 10A–10C show the platform interlock mechanism 502 with no passenger on the platform deck plate 308 and the interlock mechanism in an unlocked state, and FIGS. 11A–11C show the platform interlock mechanism 502 when a passenger has moved onto the deck plate 308 and the platform interlock mechanism in a locked state. As a passenger moves onto the deck plate 308 of the wheelchair platform, the leaf spring action of the deck plate 308 causes its center to deflect downward. The downward movement of the deck plate 308 presses the upper ends of the control levers 510 and 514 downwards, thus causing the control levers to rotate downward about fixed pivot pins 512 and 516, respectively. As the ends of the control levers 510 and 514 rotate downward, as illustrated by arrows 555 (FIG. 10A), the inner and outer ends of the interlock links 504 and 506, respectively, are pulled towards the center of the platform 26. As the interlock links 504 and 506 are pulled toward the center of the platform, spring retainers 528 and 530 are also moved inwards and compress the return springs 508. As the interlock links are pulled toward the center, the outer end of the outer interlock link 504 and the inner end of the inner interlock link 506 also move toward the center of the platform, causing the interlock pins 518 to move from the outer edge of slots 526 (FIG. 10B) to the inner edge of slots 526 (FIG. 11B), and causing the interlock pins 522 to move from the inner edge of slots 532 (FIG. 10C) to the outer edge of slots 532 (FIG. 11C). Thus, the platform interlock mechanism 502 is moved into its locked state. In the locked state, the interlock pins 518 block the path of the clevis rollers 326 from moving further inward, and the interlock pins 522 blocks the path of the clevis rollers 412 from moving further outward, thus preventing the outer and inner barriers 50 and 52, respectively, from moving/folding toward their retracted positions.

In addition to the mechanical locking provided by the interlock pins 518 and 522, the platform interlock mechanism 502 also includes an electronic locking feature to prevent the outer and inner barriers 50 and 52 from moving/folding toward their retracted positions when a passenger is on the deck plate 308. As the deck plate 308 is pressed downward by a passenger moving onto the wheelchair platform, a target plate 536 (FIG. 10A), which is fixed perpendicular to the deck plate 308, also moves downward in front of an electronic sensor 534 that is mounted on the frame 154 (FIG. 12). When the sensor 534 senses the target plate 536, it provides a signal to the control system indicating that a passenger or other article is on the wheelchair platform. As long as the control system receives a signal indicating that a passenger or other article is on the wheelchair platform, it electronically prevents the control system from moving the outer or inner barriers 50 and 52 toward their retracted positions.

Once a passenger moves off of the wheelchair platform 26, the platform interlock mechanism 502 returns to the unlocked position shown in FIGS. 10A–10C through the force of the return springs 508 and the preset camber spring force of the deck plate 308. The return springs 508 and camber spring force of the deck plate 308 are used to offset the weight of the deck plate 308 and the friction of the passenger interlock system 502 in returning the system to its normal, unlocked state.

The wheelchair lift 20 of the present invention reduces or eliminates a number of the problems associated with prior art wheelchair lifts. The use of an inner barrier 52 to form a bridge between the wheelchair platform 26 and the steps 124*b* of the bus allows the wheelchair lift to be used on different vehicles with only minor changes. The same design wheelchair lift 20 may be used in different vehicles by adjusting the height to which the wheelchair platform 26 is raised and the length of the inner barrier or bridge 52.

The wheelchair lift 20 also incorporates a number of features to prevent or reduce the possibility of improper operation of the wheelchair lift. Such features include foldable outer and inner barriers 50, 52 to prevent a wheelchair from moving off of the wheelchair platform 26. The electronic control system that controls the wheelchair barriers is designed to prevent the barriers and lift from operating in ways and at times which could allow the barriers to fold inward onto a wheelchair, wheelchair occupant or other item located on the wheelchair platform, even if sensor failure occurs.

The wheelchair lift includes redundant mechanical and electronic locking mechanisms. A ground interlock mechanism 440 also both mechanically and electrically prevents the outer barrier 50 from moving to its fully extended position while the wheelchair platform 26 is not touching the ground.

The ground interlock mechanism 440 includes a stow lever 454 which serves to fold-up the ground interlock mechanism 440 for storage.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A wheelchair lift comprising:

(a) a wheelchair platform moveable between a raised position and a lowered position;

(b) at least one wheelchair barrier pivotally attached to one end of the wheelchair platform, the wheelchair barrier being moveable between an extended position in which the wheelchair barrier extends outward from the end of the wheelchair platform, an upright position in which the wheelchair barrier extends upward from the surface of the wheelchair platform to help prevent a wheelchair located on the wheelchair platform from moving off of the end of the wheelchair platform and a retracted position in which the wheelchair barrier lies approximately adjacent to an upper surface of the wheelchair platform; and (c) a platform interlock mechanism coupled to the wheelchair platform, the platform interlock mechanism being moveable between an unlocked position in which the wheelchair barrier is moveable between the upright position and the retracted position and a locked position in which the platform interlock mechanism mechanically prevents the wheelchair barrier from moving from the upright position to the retracted position and, wherein the platform interlock mechanism remains in the unlocked position as long as weight is not placed on the wheelchair platform and moves from the unlocked position to the locked position when weight is placed on the wheelchair platform.

2. The wheelchair lift of claim 1, wherein the platform interlock mechanism includes a deformable deck and where the deck deforms when the weight is placed on the deck causing the platform interlock mechanism to move to the locked position.

3. The wheelchair lift of claim 2, wherein the platform interlock mechanism includes at least one interlock link that extends from approximately the center of the platform to approximately the edge of the platform on which the wheelchair barrier is mounted, the interlock link moving inward and outward in response to deformation of the deck to lock or unlock the platform interlock mechanism.

4. The wheelchair lift of claim 1, wherein the wheelchair barrier includes a hinge mechanism that moves the wheelchair barrier between the extended, upright and retracted positions and wherein the platform interlock mechanism mechanically prevents the movement of the hinge mechanism toward the retracted position when the platform interlock mechanism is in the locked position.

5. The wheelchair lift of claim 4, wherein the platform interlock mechanism includes an interlock pin that prevents movement of the hinge mechanism and wheelchair barrier between the upright and retracted positions when the platform interlock mechanism is in the locked position.

6. The wheelchair lift of claim 4, wherein the hinge mechanism includes a link that is connected to an actuator on one end and wherein the platform interlock mechanism prevents motion of the link in one direction when the platform interlock mechanism is in the locked position.

7. The wheelchair lift of claim 1, wherein the platform interlock mechanism includes a biasing mechanism to bias the platform interlock mechanism into the unlocked position.

8. The wheelchair lift of claim 7, wherein the platform interlock mechanism includes a deformable deck and wherein the biasing mechanism biases the deck upward.

9. The wheelchair lift of claim 8, wherein the platform interlock mechanism includes at least one interlock link that extends from approximately the center of the platform to approximately the edge of the platform on which the wheelchair barrier is mounted, the interlock link moving inward and outward in response to deformation of the deck to lock or unlock the platform interlock mechanism.

10. The wheelchair lift of claim 9, wherein the wheelchair barrier includes a hinge mechanism that moves the wheelchair barrier between the extended, upright and retracted positions and wherein the platform interlock mechanism mechanically prevents the movement of the hinge mechanism toward the retracted position when the platform interlock mechanism is in the locked position.

11. The wheelchair lift of claim 10, wherein the platform interlock mechanism includes an interlock pin that prevents movement of the hinge mechanism and wheelchair barrier between the upright and retracted positions when the platform interlock mechanism is in the locked position.

12. The wheelchair lift of claim 11, wherein the interlock pin is connected to the interlock link and moves inward and outward with the interlock link as the deck deforms.

13. The wheelchair platform of claim 1, wherein the platform interlock mechanism further includes an electronic sensor that provides a control system a signal indicative of when the platform interlock mechanism is in the locked position.

14. A wheelchair lift comprising:

(a) a wheelchair platform moveable between a raised position and a lowered position, the wheelchair platform including:

(b) at least one wheelchair barrier pivotally attached to one end of the wheelchair platform, the wheelchair barrier being moveable between an extended position in which the wheelchair barrier extends outward from the end of the wheelchair platform to an upright position in which the wheelchair barrier extends upward from the surface of the wheelchair platform and helps to prevent a wheelchair located on the wheelchair platform from moving off the wheelchair platform and a retracted position in which the wheelchair barrier lies approximately adjacent to an upper surface of the wheelchair platform;

(c) a hinge mechanism connected between the wheelchair platform and the wheelchair barrier, the hinge mechanism moving the wheelchair platform between the extended, upright and retracted positions in response to the movement of an actuator; and (d) a platform interlock mechanism coupled to the wheelchair platform, the platform interlock mechanism being moveable between an unlocked position in which the wheelchair barrier is free to move between the upright position and the retracted position and a locked position in which the platform interlock mechanism mechanically prevents the movement of the hinge mechanism and actuator in one direction to prevent the wheelchair barrier from moving from the upright position to the retracted position.

15. The wheelchair lift of claim 14, wherein the platform interlock mechanism remains in the locked position whenever a weight is placed on the raised wheelchair platform.

16. The wheelchair lift of claim 14, wherein the platform interlock mechanism includes a deformable deck and wherein the deck deforms when the weight is placed on the deck causing the platform interlock mechanism to move to the locked position.

17. The wheelchair lift of claim 16, wherein the platform interlock mechanism further includes at least one interlock link that extends from approximately the center of the platform to approximately the edge of the platform on which the wheelchair barrier is mounted, the interlock link moving inward and outward in response to deformation of the deck to lock or unlock the platform interlock mechanism.

18. The wheelchair lift of claim 14, wherein the platform interlock mechanism includes a biasing mechanism that biases the platform interlock mechanism into the unlocked position when weight is placed on the wheelchair platform.

19. The wheelchair lift of claim 14, further comprising a ground interlock mechanism that mechanically prevents movement of the wheelchair barrier from the upright position to the extended position as the wheelchair platform is moved between the raised position and the lowered position.

20. The wheelchair lift of claim 14, wherein the platform interlock mechanism further comprises an electronic sensor that detects when the platform interlock mechanism is in the locked position and provides a signal indicative of the position of the platform interlock mechanism to a control system.

21. A wheelchair lift comprising:

(a) a wheelchair platform movable between a raised position and a lowered position the wheelchair platform including a deformable deck that deforms when a wheelchair is placed on top of the wheelchair platform, deformation of the deformable deck providing the wheelchair lift an indication of the presence of the wheelchair on the wheelchair platform;

(b) at least one wheelchair barrier pivotally attached to one end of the wheelchair platform, the wheelchair barrier being movable between an extended position in which the wheelchair barrier extends outward from the end of the wheelchair platform, an upright position in which the wheelchair barrier extends upward from the surface of the wheelchair platform and helps to prevent a wheelchair located on the wheelchair platform from moving off of the wheelchair platform, and a retracted position in which the wheelchair barrier is in a position that allows the wheelchair platform to be moved to a stowed position when not in use; and (c) a control system that receives the indication of the presence of the wheelchair on the wheelchair platform and that controls the movement of the wheelchair barrier in response to the indication of the load on the wheelchair platform.

22. The wheelchair lift of claim 21, wherein the control system prevents the wheelchair barrier from moving to its retracted position when the deck is deformed by the wheelchair placed on the deck.

23. The wheelchair lift of claim 21, further comprising a platform interlock mechanism coupled to the wheelchair platform, the platform interlock mechanism being movable between an unlocked position in which the wheelchair barrier is free to move between the upright position and the retracted position and a locked position in which the platform interlock mechanism mechanically prevents the movement of the wheelchair barrier to prevent the wheelchair barrier from moving to the retracted position.

24. The wheelchair lift of claim 21, further comprising a ground interlock mechanism that mechanically prevents movement of the wheelchair barrier from the upright position to the extended position as the wheelchair platform is moved between the raised position and the lowered position.

25. The wheelchair lift of claim 21, further comprising an electronic sensor that detects when the deck is deformed by the wheelchair placed on top of the deck, the electronic sensor providing a signal indicative of the wheelchair placed on the deck to the control system.

* * * * *